United States Patent
Tashiro et al.

(10) Patent No.: US 6,825,639 B2
(45) Date of Patent: Nov. 30, 2004

(54) CHARGING/DISCHARGING APPARATUS AND METHOD, POWER SUPPLYING APPARATUS AND METHOD, POWER SUPPLYING SYSTEM AND METHOD, PROGRAM STORAGE MEDIUM, AND PROGRAM

(75) Inventors: Kei Tashiro, Kanagawa (JP); Hideyuki Sato, Chiba (JP); Yukio Tsuchiya, Kanagawa (JP); Kiyotaka Murata, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/257,299
(22) PCT Filed: Feb. 7, 2002
(86) PCT No.: PCT/JP02/01041
§ 371 (c)(1), (2), (4) Date: Jun. 2, 2003
(87) PCT Pub. No.: WO02/065612
PCT Pub. Date: Aug. 22, 2002

(65) Prior Publication Data
US 2003/0188204 A1 Oct. 2, 2003

(30) Foreign Application Priority Data
Feb. 14, 2001 (JP) .......................................... 2001-37412

(51) Int. Cl.$^7$ ........................ H01M 10/44; H01M 10/46
(52) U.S. Cl. ..................................................... 320/132
(58) Field of Search ............................... 320/127, 128, 320/132, 149, 157, 162, 164

(56) References Cited

U.S. PATENT DOCUMENTS 5,565,759 A * 10/1996 Dunstan ..................... 320/135
5,672,951 A * 9/1997 Shiota ........................ 320/132
6,495,989 B1 * 12/2002 Eguchi ....................... 320/132
2003/0034780 A1 * 2/2003 Vacher ....................... 324/427
2003/0169017 A1 * 9/2003 Ariga et al. ................ 320/125

FOREIGN PATENT DOCUMENTS

| JP | 6-331714 | 12/1994 |
| JP | 10-69925 | 3/1998 |
| JP | 10-260236 | 9/1998 |
| JP | 10-274670 | 10/1998 |
| JP | P2001-57246 | 2/2001 |
| JP | P2001-57247 | 2/2001 |
| JP | P2001-126779 | 5/2001 |

* cited by examiner

Primary Examiner—Edward H. Tso
(74) Attorney, Agent, or Firm—Frommer Lawrence & Haug LLP; William S. Frommer

(57) ABSTRACT

In case of the present invention, a microcomputer (271) controls a charging mode changeover switch (275) and connects the switch to a terminal (275d) to change the terminal (275d) to an initial charging mode power source (278). In this case, the microcomputer (271) requests the information on the charging capacity stored in a microcomputer (252) as charging information, the charging voltage measured by a voltage detector (258) and a standard charging capacity and obtains the information through a communication circuits (254) and (272). The microcomputer (271) obtains an actual charging capacity in accordance with a received measured charging voltage, compares the actual charging capacity with a stored charging capacity, and updates the actual charging capacity to zero when the comparison result is equal to or larger than a threshold value and the charging voltage is equal to or less than another threshold value. According to the present invention, a charging capacity is correctly corrected.

15 Claims, 19 Drawing Sheets

CHARGING/DISCHARGING APPARATUS AND METHOD, POWER SUPPLYING APPARATUS AND METHOD, POWER SUPPLYING SYSTEM AND METHOD, PROGRAM STORAGE MEDIUM, AND PROGRAM

TECHNICAL FIELD

The present invention relates to a charging/discharging apparatus and method, a power supplying apparatus and method, a power supplying system and method, a program storing medium, and a program; and particularly to a charging/discharging apparatus and method, power supplying apparatus and method, a power supplying system and method, a program storing medium, and a program where the charging capacity of a charging/discharging apparatus can accurately be corrected.

BACKGROUND ART

A so called charging/discharging technique is generally becoming popular in which power is supplied from such a power supplying apparatus as a battery charger to a charging/discharging apparatus represented by a battery pack used in a video camera or the like to charge the same.

As a recent battery pack, a battery pack of such a type where a microcomputer is incorporated therein and the charging capacity of the battery pack is memorized or stored in the computer has been provided for a practical use. In the battery pack of this type, the computer causes a built-in RAM (Random Access Memory), an EEPROM (Electrically Erasable Programmable Read Only Memory), a ROM (Read Only Memory) or the like to store data or information on the charging capacity of a battery pack now on use. When this battery pack is set to a video camera or a battery charger, the microcomputer reads out the stored information on the charging capacity to transmit the information to the video camera or the battery charger. On the other hand, the operation time or the charging time of the battery pack is calculated on the basis of this information and displayed in the video camera or the battery charger.

Regarding the power charged in a battery pack, however, it has been known that, even though the battery pack which has just charged had a charging capacity from which an allowable operation time of 120 minutes is calculated, for example, as shown in FIG. 1, when the battery pack is left in a non-use state for a long time, the battery pack gradually self-discharges. For example, when the charged battery pack is put in a non-use state for six months, the charging capacity of the battery pack stored in a memory is 120 minutes but its actual charging capacity is reduced to about 10% of the charging capacity stored in the memory.

In general, the allowable operation time of a battery pack has a relationship with the charging voltage of the battery pack shown in FIG. 2. That is, in case of the charging capacity of a battery pack which can drive a video camera for 120 minutes at maximum, for example, indication of about 8.4V shows a full charged state (100% charged state), and a time display of 120 minutes is performed as the allowable operation time. Then, the charging voltage and the allowable operation time decreases as an operating time elapses. Here, a pre-end voltage Vpre (Voltage Pre-end) (for example, 6.7 V) in FIG. 2 is a voltage value indicating that only a short allowable operation time is left. That is, when the allowable operation time becomes zero, there may occurs a problem that a saving operation can not be performed safely during execution of various processing. Under such circumstances, the pre-end voltage Vpre is set for warning a user in a state the allowable operation time is still left before the charging voltage reaches an end voltage Ve (Voltage end) (for example, 6.5V: a voltage at which a video camera or the like can not be driven) in order to prompt the user to perform a saving operation safely.

However, when the battery pack fully charged is kept in a non-operation state for a long time, the relationship between the charging time and the allowable operation time varies due to self-discharging of the battery pack, for example, as shown in FIG. 3. That is, since the charging voltage is changed to a lowered state (the charging capacity is reduced) due to the self-discharging, which results in reduction in actual allowable operation time. Even in this state, however, since the allowable operation time at a full charged state has been stored in the RAM, there is a problem that, though an actual allowable operation time is 30 minutes or so, the allowable operation time indication displays about 80 minutes, which causes an error. Incidentally, the allowable charging capacity has been actually stored in the RAM, and the allowable operation time is computed in the battery charger or the like on the basis of the allowable charging capacity to be displayed.

Also, as a method for detecting a self-discharge of a battery pack in case that the battery pack is left for a long time without using the same, there is a method where the state of a battery pack while it is not operated is monitored by a microcomputer in the battery pack and a self-discharged amount corresponding to the monitored state is reduced from the original charged state so that an error in an allowable operation time display of the battery is corrected. At this time, a power source for driving the microcomputer in the battery pack uses the power of the battery pack.

However, in case that the self-discharged amount due to the long term non-use is detected by the microcomputer in the battery pack, there occurs a case that a power more than that discharged due to the self-discharging of the battery pack is consumed for driving the microcomputer, and therefore a problem occurs that a non-use time of the battery pack must be significantly reduced.

Furthermore, there is a problem that an over-discharged state occurs in that the voltage of the battery pack is discharged below a voltage level required for maintaining functions of the battery pack, which injures a safety or a reliability of the battery pack.

As set forth above, it is considered to be desirable that the microcomputer in the battery pack is controlled to a non-operation state (microcomputer sleep) in a state that the battery pack is not used (a state that charging and discharging are not conducted).

The present invention has been made in view of these circumstances, and an object thereof is to perform correction such that an allowable operation time of a battery pack can be displayed accurately.

DISCLOSURE OF THE INVENTION

A first charging/discharging apparatus of the present invention is characterized by comprising standard charging capacity storing means for storing a standard charging capacity, charging capacity storing means for storing the present charging capacity, charging voltage value measuring means for measuring a charging voltage value, transmitting means for transmitting the information on a standard charging capacity, a charging capacity and a charging voltage value to a power supplying apparatus, receiving means for receiving a command for correcting a charging capacity form the power supplying apparatus, and correcting means for correcting the stored charging capacity based on the received from the receiving means.

It is possible to make the charging voltage value measuring means measure a charging voltage value when the value of the current of the power supplied from a power supplying apparatus is zero or a sufficiently small value close to zero.

When the charging voltage value is a predetermined voltage value corresponding to a charging capacity close to zero or less and the charging capacity stored by the charging capacity storing means has a predetermined rate of a standard charging capacity or more, it is possible to make the correcting means correct the stored charging capacity to zero or a value corresponding to zero.

It is possible to further provide current value measuring means for measuring the charging current value or discharging current value.

It is possible to make the current value measuring means measure a charging current value or a discharging current value when the power supplied from a power supplying apparatus is equal to zero or a sufficiently small value close to zero.

When the charging current value is equal to or less than a predetermined current value corresponding to a charging capacity close to zero and the charging capacity stored by the charging capacity storing means has a predetermined rate of a standard charging capacity or more, it is possible to make the correcting means correct the stored charging capacity to zero.

It is possible to make the transmitting means further transmit not only the information on a standard charging capacity, a charging capacity and a charging voltage value but also a charging current value, a discharging current value or temperature data to a power supplying apparatus.

A first charging/discharging method of the present invention is characterized by including a standard charging capacity storing step of storing a standard charging capacity, a charging capacity storing step of storing the present charging capacity, a charging voltage value measuring step of measuring a charging voltage value, a transmitting step of transmitting the information on a standard charging capacity, a charging capacity and a charging voltage value to a power supplying apparatus, a receiving step of receiving a command for correcting a charging capacity from the power supplying apparatus, and a correcting step of correcting the stored charging capacity based on the command received through the processing in the receiving step.

A program of a first program storing medium of the present invention is characterized by including a standard charging capacity storage controlling step of controlling storage of a standard charging capacity, a charging capacity storage controlling step of controlling storage of the present charging capacity, a charging voltage value measurement controlling step of controlling measurement of a charging voltage value, a transmission controlling step of controlling transmission of the information on a standard charging capacity, charging capacity, and charging voltage value to a power supplying apparatus, a reception controlling step of controlling reception of a command for correcting a charging capacity, and a correction controlling step of controlling correction of the stored charging capacity.

A first program of the present invention is characterized by executing a standard charging capacity storage controlling step of controlling storage of a standard charging capacity, a charging capacity storage controlling step of controlling storage of the present charging capacity, a charging voltage value measurement controlling step of controlling measurement of a charging voltage value, a transmission controlling step of controlling transmission of the information on a standard charging capacity, a charging capacity and a charging voltage value to a power supplying apparatus, a reception controlling step of controlling reception of a command for correcting a charging capacity and a correction controlling step of controlling correction of the stored charging capacity.

A power supplying apparatus of the present invention is characterized by comprising receiving means for receiving the information on the standard charging capacity, the charging capacity and the charging voltage value of a charging/discharging apparatus transmitted from the charging/discharging apparatus and transmitting means for transmitting a command for correcting a charging capacity to zero or a value corresponding to zero to the charging/discharging apparatus when a charging voltage value is equal to or less than a predetermined voltage value corresponding to a charging capacity close to zero and the charging capacity has a predetermined rate of the standard charging capacity or more.

It is possible to further provide current controlling means for controlling the current value of the power to be supplied to the charging/discharging apparatus and set a charging voltage value to a value when a current is controlled to zero or a sufficiently small value close to zero by current controlling means.

It is possible to make the receiving means receive not only a standard charging capacity, a charging capacity and a charging voltage value but also a charging current value or a discharging current value transmitted from a charging/discharging apparatus.

It is possible to further provide current controlling means for controlling the value of the power to be supplied to the charging/discharging apparatus and set a charging current value or a discharging current value to a value when the current value is controlled to zero of a sufficiently small value close to zero by current controlling means.

A power supplying method of the present invention is characterized by including a receiving step of receiving the information on the standard charging capacity, the charging capacity and the charging voltage value of a charging/discharging apparatus transmitted from the charging/discharging apparatus and a transmitting step of transmitting a command for correcting a charging capacity to zero or a value corresponding to zero when a charging voltage value is equal to or less than a predetermined voltage value corresponding to a charging capacity close to zero and the charging capacity has a predetermined rate of the standard charging capacity or more.

A program of a second program storing medium of the present invention is characterized by including a reception controlling step of controlling reception of the information on the standard charging capacity, the charging capacity and the charging voltage value of a charging/discharging apparatus transmitted from the charging/discharging apparatus and a transmission controlling step of controlling transmission of a command for correcting a charging capacity to zero or a value corresponding to zero when the charging capacity has a predetermined rate of the standard charging capacity or more.

A second program of the present invention is characterized by executing a reception controlling step of controlling reception of the information on the standard charging capacity, the charging capacity and the charging voltage value of a charging/discharging apparatus transmitted from the charging/discharging apparatus and a transmission controlling step of controlling transmission of a command for correcting a charging capacity to zero or a value corresponding to zero when the charging voltage value is equal to or less than a predetermined voltage value corresponding to a charging capacity close to zero and the charging capacity has a predetermine rate of the standard charging capacity.

A first power supplying system of the present invention is characterized in that a charging/discharging apparatus is provided with standard charging capacity storing means for storing a standard charging capacity, charging capacity storing means for storing the present charging capacity, charging voltage value measuring means for measuring a charging voltage value, first transmitting means for transmitting the information on a standard charging capacity, charging capacity, and charging voltage value to a power supplying apparatus, first receiving means for receiving a command for correcting the charging capacity from the power supplying apparatus, and correcting means for correcting the stored charging capacity in accordance with the command received by the first receiving means; and the power supplying apparatus is provided with second receiving means for receiving the standard charging capacity, charging capacity, and charging voltage value of the charging/discharging apparatus transmitted from the charging/discharging apparatus and second transmitting means for transmitting a command for correcting the charging capacity to zero or a value corresponding to zero when the charging voltage value is equal to or less than a predetermined voltage value corresponding to a charging capacity close to zero and the charging capacity has a predetermined rate of the standard charging capacity or more.

A power supplying method of a first power supplying system of the present invention is characterized in that a charging/discharging method of a charging/discharging apparatus includes a standard charging capacity storing step of storing a standard charging capacity, a charging capacity storing step of storing the present charging capacity, a charging voltage value measuring step of measuring a charging voltage value, a first transmitting step of transmitting the information on a standard charging capacity, a charging capacity and a charging voltage value to a power supplying apparatus, a first receiving step of receiving a command for correcting the charging capacity from the power supplying apparatus, and a correcting step of correcting the stored charging capacity based on the command received through the processing in the first receiving step; and a power supplying method of the power supplying apparatus includes a second receiving step of receiving the standard charging capacity, the charging capacity and the charging voltage value of the charging/discharging apparatus transmitted from the charging/discharging apparatus and a second transmitting step of transmitting a command for correcting the charging capacity to zero or a value corresponding to zero when the charging voltage value is equal to or less than a predetermined voltage value corresponding to a charging capacity close to zero and the charging capacity has a predetermined rate of the standard charging capacity or more.

A program of a third program storing medium of the present invention is characterized in that a program for controlling a charging/discharging apparatus includes a standard charging capacity storage controlling step of controlling storage of a standard charging capacity, a charging capacity storage controlling step of controlling storage of the present charging capacity, a charging voltage value measurement controlling step of controlling measurement of a charging voltage value, a fist transmission controlling step of controlling transmission of the information on a standard charging capacity, a charging capacity and a charging voltage value to a power supplying apparatus, a first reception controlling step of controlling reception of a command for correcting the charging capacity from the power supplying apparatus, and a correction controlling step of controlling correction of the stored charging capacity in accordance with the command received through the processing in the first reception controlling step; and a program for controlling the power supplying apparatus includes a second reception controlling step of controlling reception of the information on the standard charging capacity, charging capacity, and charging voltage value of the charging/discharging apparatus transmitted from the charging/discharging apparatus and a second transmission controlling step of controlling transmission of a command for correcting a charging capacity to zero or a value corresponding to zero when the charging voltage value is equal to or less than a predetermined voltage value corresponding to a charging capacity close to zero and the charging capacity has a predetermined rate of the standard charging capacity or more.

A third program of the present invention is characterized by making a computer for controlling a charging/discharging apparatus execute a standard charging capacity storage controlling step of controlling storage of a standard charging capacity, a charging capacity storage controlling step of controlling storage of the present charging capacity, a charging voltage value measurement controlling step of controlling measurement of a charging voltage value, a first transmission controlling step of controlling transmission of the information on a standard charging capacity, a charging capacity and a charging voltage value to a power supplying apparatus, a first reception controlling step of controlling reception of a command for correcting a charging capacity from the power supplying apparatus, and a correction controlling step of controlling correction of a charging capacity based on the command received through the processing in the first reception controlling step; and a computer for controlling the power supplying apparatus execute a second reception controlling step of controlling reception of the information on the standard charging capacity, the charging capacity and the charging voltage value of the charging/discharging apparatus transmitted from the charging/discharging apparatus and a second transmission controlling step of controlling transmission of a command for correcting a charging capacity to zero or a value corresponding to zero when the charging capacity has a predetermined rate of the standard charging capacity.

In case of charging/discharging apparatus and method and a program of the present invention, a standard charging capacity is stored, the present charging capacity is stored, a charging voltage value is measured, the information of the standard charging capacity, the charging capacity and the charging voltage value are transmitted to a power supplying apparatus, and a command for correcting a charging capacity is received from the power supplying apparatus and the stored charging capacity is corrected based on the received command.

In case of power supplying apparatus and method and a program of the present invention, the standard charging capacity, the charging capacity and the charging voltage value of a charging/discharging apparatus transmitted from the charging/discharging apparatus are received and a command for correcting a charging capacity to zero or a value corresponding to zero is transmitted to the charging/discharging apparatus when a charging voltage value is equal to or less than a predetermined voltage value corresponding to a charging capacity close to zero and the charging capacity has a predetermined rate of the standard charging capacity or more.

In case of power supplying system and method and a program of the present invention, a charging/discharging apparatus stores a standard charging capacity and the present charging capacity, measures a charging voltage value, and transmits the information on a standard charging capacity, a charging capacity and a charging voltage value to a power supplying apparatus; and a power supplying apparatus receives a command for correcting a charging capacity, corrects the stored charging capacity based on the received command, receives the information on the standard charging capacity, the charging capacity and the charging voltage value of the charging/discharging apparatus transmitted from the charging/discharging apparatus, and transmits a command for correcting a charging capacity to zero or a value corresponding to zero to the charging/discharging apparatus when the charging voltage value is equal to or less than a predetermined voltage value corresponding to a charging capacity close to zero and the charging capacity has a predetermined rate of the standard charging capacity.

BEST MODE FOR CARRYING OUT THE INVENTION

Figure 1:
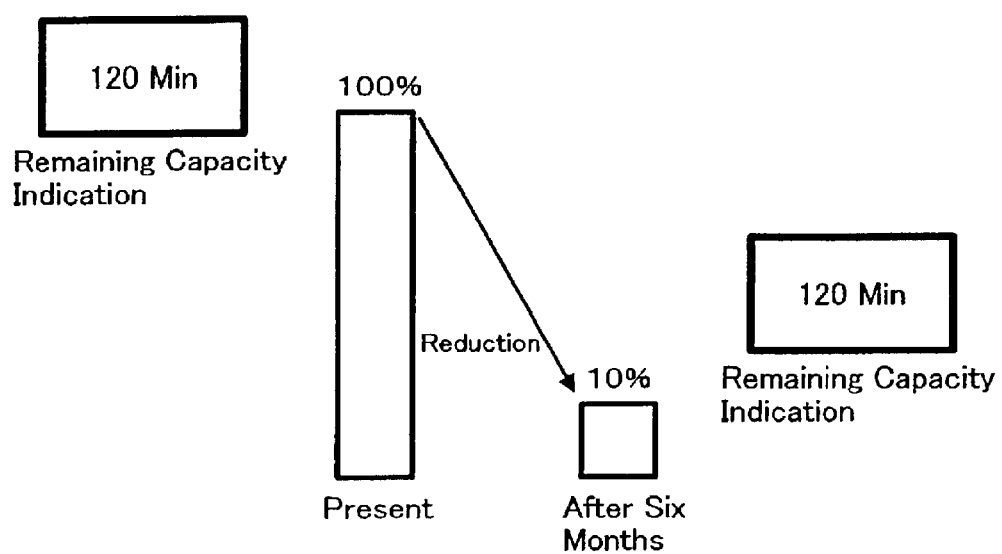
FIG. 1 is a view for explaining the relation between charging capacity and remaining capacity indication when a battery pack is not operated for a long time.
Figure 2:
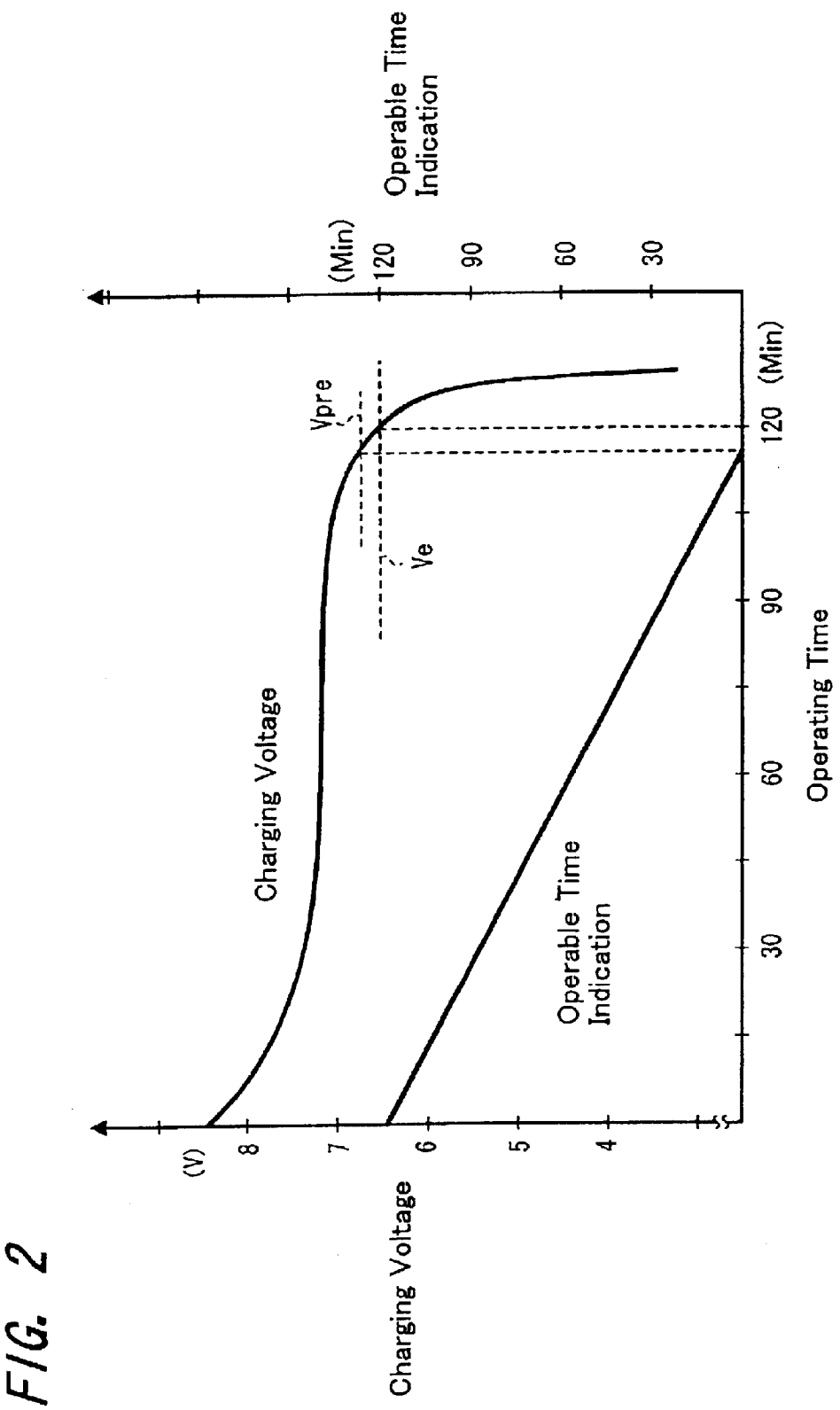
FIG. 2 is a view for explaining relations between charging capacity, allowable operation time, and operating time of a battery pack.
Figure 3:
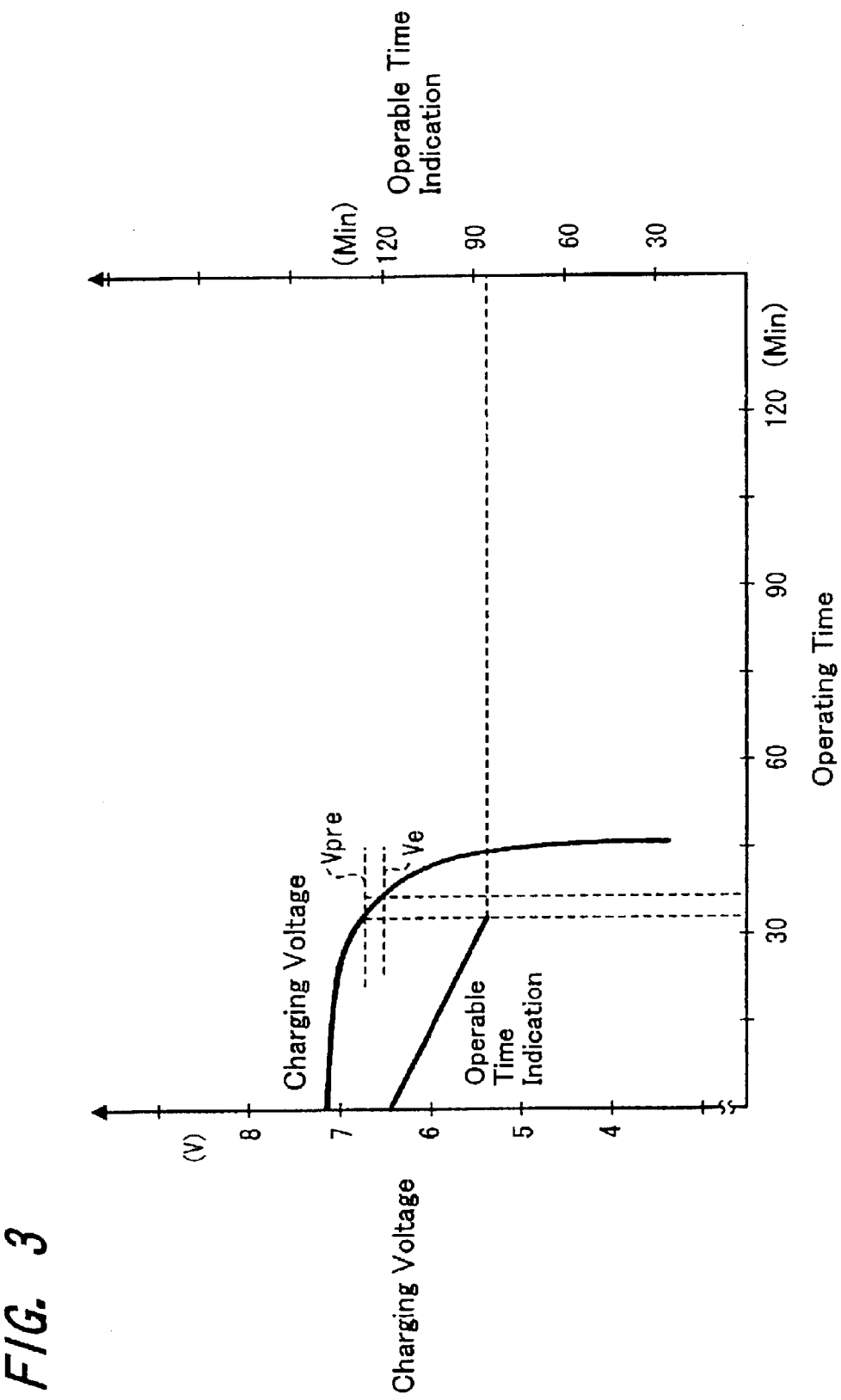
FIG. 3 is a view showing relations between charging capacity, allowable operation time display, and operating time of a battery pack when the battery pack is not operated for a long time.
Figure 4:
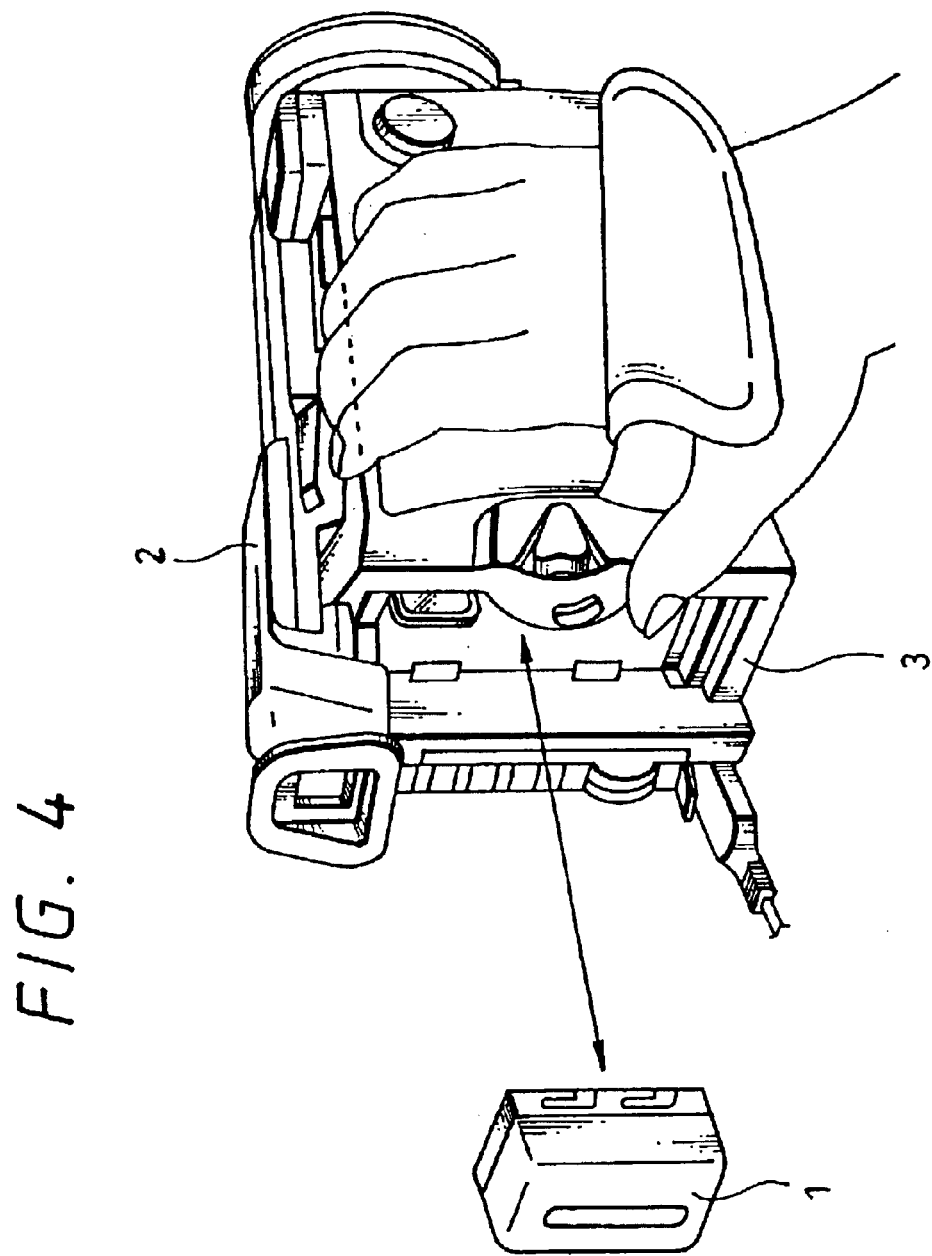
FIG. 4 is a view for explaining a SQ battery pack.

FIG. 4 is a view showing a configuration of an embodiment of a SQ (Super-quick) battery pack 1 of the present invention. The SQ battery pack 1 is set to a battery attaching portion 3 of a video camera 2. The SQ battery pack 1 is attached to the battery attaching portion 3 of the video camera 2 to supply power to the video camera 2. Moreover, with reference to FIG. 8, the SQ battery pack 1 is constituted such that it can be attached to a battery charger 151 to be described later, which is charged by the battery charger 151. Moreover, a conventional battery pack 11 (FIG. 7) can be set to the battery attaching portion 3. The charging time of the SQ battery pack 1 is shorter than that of the conventional battery pack 11, because it can be charged at a larger current when it is charged by the battery charger 151.

Figure 5:
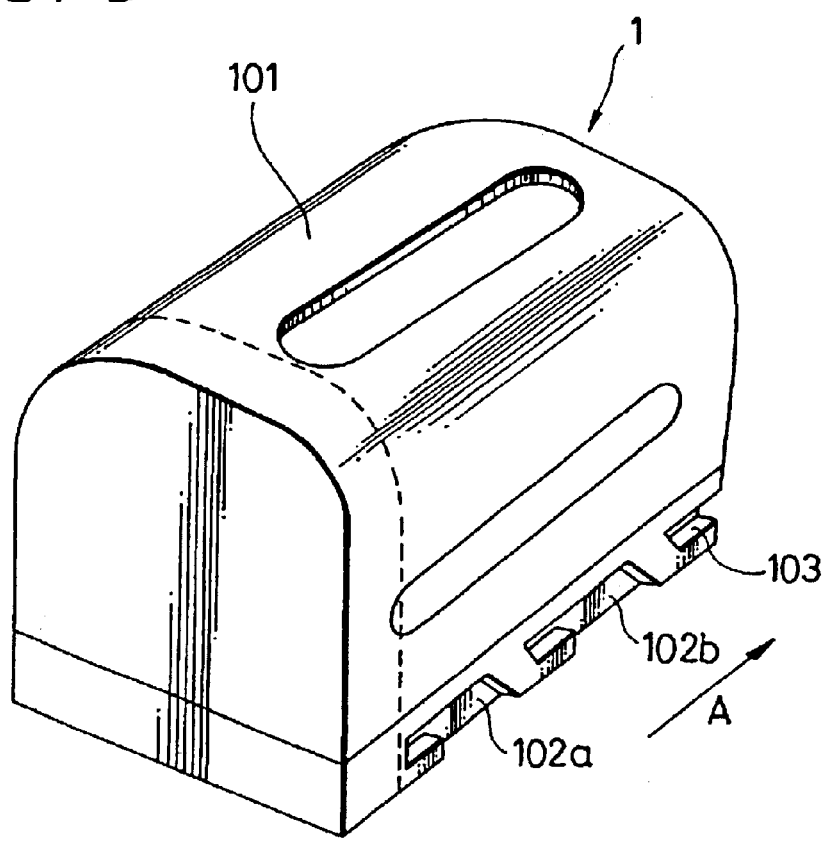
FIG. 5 is a view showing details of the SQ battery pack in FIG. 1.
Figure 15:
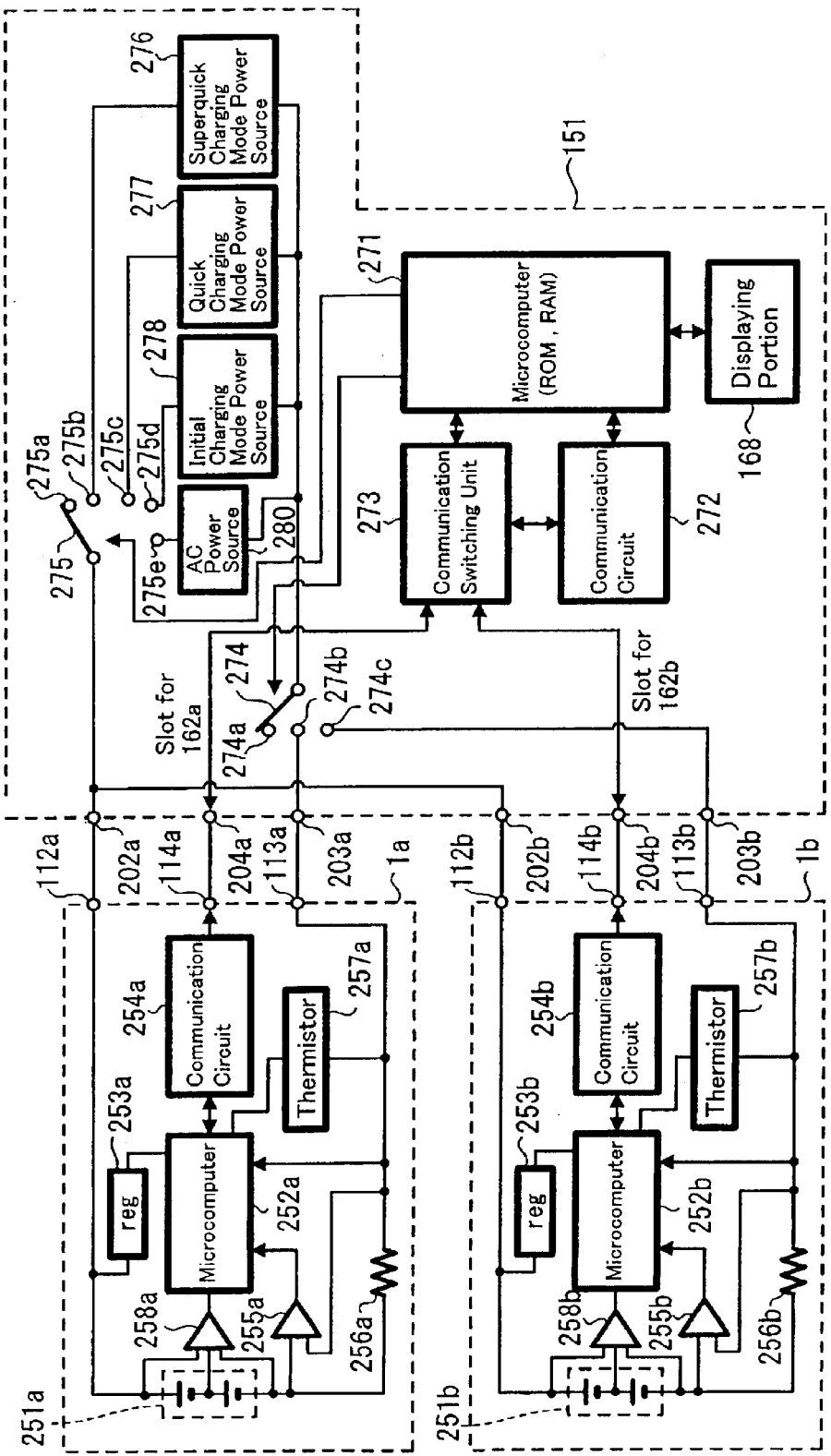
FIG. 15 is an electrical configuration of a SQ battery pack and a battery charger.

Then, details of the SQ battery pack 1 are described below with reference to FIG. 5. As shown in FIG. 5, a case 101, which stores a battery cell 251a or 251b with reference to FIG. 15, is provided in the pack 1.

The case 101 of the SQ battery pack 1 is formed by a synthetic resin. Guide grooves 102a to 102d (FIG. 6) for guiding the battery attaching portion 3, or slots 162a or 162b of battery charger 151 in the attaching direction shown by the arrow A in FIG. 5 are formed on the width directional both side faces of the case 101. In FIG. 5 only the guide grooves 102a and 102b are shown.

In the following description, the guide grooves 102a to 102d are referred to as the guide 102 when it is not necessary to individually distinguish the guide grooves 102a to 102d. The same is applied to other configurations.

Figure 6:
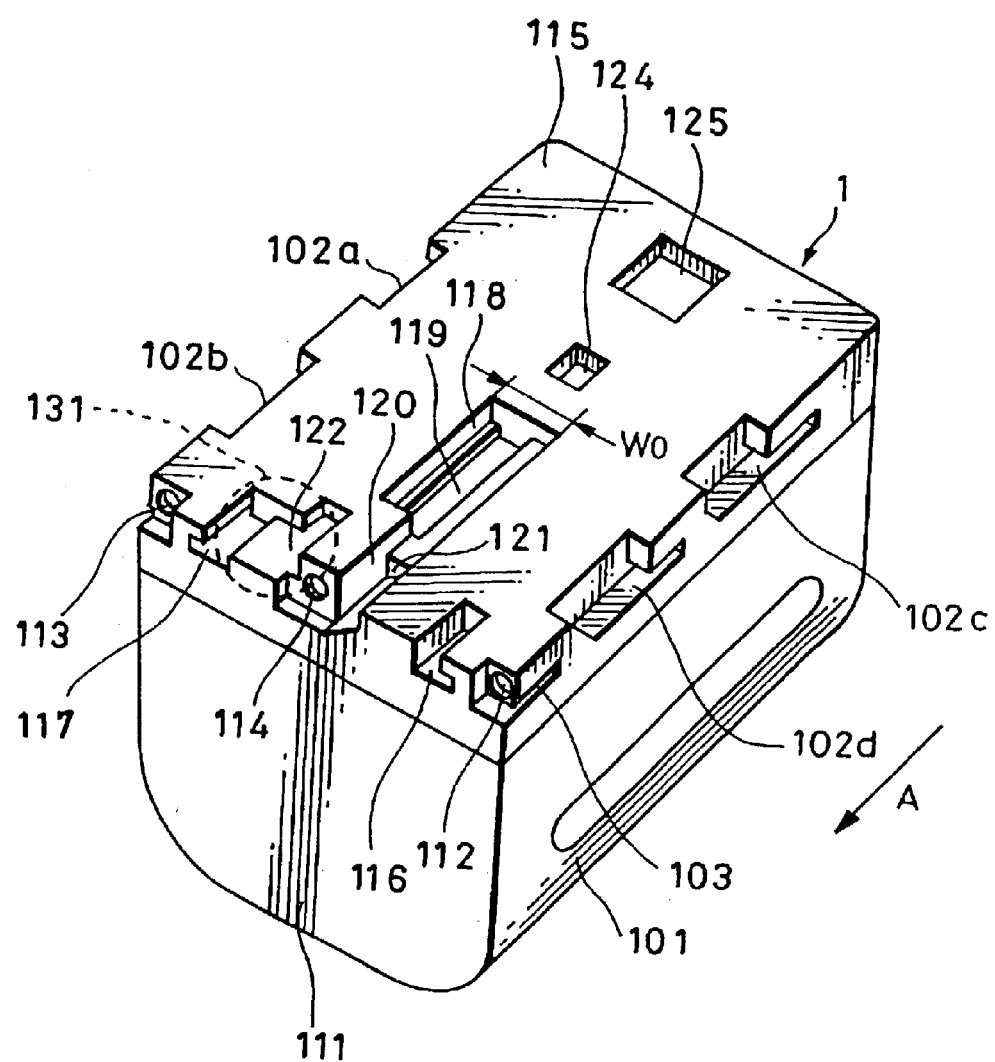
FIG. 6 is a view showing details of the SQ battery pack in FIG. 1.

As shown in FIG. 6, each guide groove 102 on each side face is formed while one end of the groove 102 is opened on the bottom 115 of the case 101 and formed in the longitudinal direction of the case 101 in parallel.

Input/output terminals 112 and 113 are formed at the width directional both sides of the case 101 at the front portion 111 shown by the direction of the arrow A in FIG. 6 to the battery attaching portion 3 or a slot 162 of the battery charger 151 and a communication terminal 114 is attached to the approximate center in the width direction.

The input/output terminals 112 and 113 receive power from the battery charger 151 and at the same time supply power to the video camera 2 via terminals not shown. The communication terminal 114 communicates with the battery charger 151 or the video camera 2 relating the information such as the charging capacity, the standard charging capacity and the charging voltage of and SQ battery pack 1. Outward one ends of the input/output terminals 112 and 113 and communication terminal 114 are located in an approximately rectangular concave portion formed at the front portion 111 of the case 101. Therefore, the battery attaching portion 3 or the battery charger 151 is prevented from being broken due to the contact with a portion other than each connection terminal.

A pair of controlling concave portions 116 and 117 are formed on the front portion 111 in the setting direction (front portion in longitudinal direction) shown by the arrow A in FIG. 6 at the bottom 115 of the case 101. As shown in FIG. 6, these controlling concave portions 116 and 117 are formed so as to be line symmetric to the approximate center line (not illustrated) in the transverse direction. For setting, these controlling concave portions 116 and 117 are engaged with controlling convex portions 206 and 207 of the battery charger 151 (FIG. 10) to control the width directional tilt of the bottom 115 of the case 101 from the slots 162.

As shown in FIG. 6, the controlling concave portions 116 and 117 are respectively provided with a first portion formed perpendicularly to the bottom 115 of the case 101 and a second portion formed perpendicularly to the first portion and whose cross sections are respectively formed like L shape. Moreover, an approximately rectangular identifying concave portion 118 for identifying the adaptive slot 162 is formed at the approximate center of the bottom 115 of the case 101.

As shown in FIG. 6, the identifying concave portion 118 is formed on the approximate center line of the case 101 in its width direction and located at the front portion 111 at the approximate center of the bottom 115 of the case 101. An approximately rectangular identifying groove 119 is continuously formed at the longitudinal directional both ends on the approximate width directional center line of the case 101 at the bottom of the inside of the identifying concave portion 118. A stepped portion is formed at the width directional both sides of the bottom 115 of the case 101 in the identifying concave portion 118.

The dimension of the width-directional both sides of the identifying concave portion 118 is formed at the dimension width WO (WO is a predetermined dimension).

Moreover, a guide groove 120 adjacent to the communication terminal 114 is formed in parallel with the longitudinal direction of the case 101. One end of the guide groove 120 opens at the front portion 111 of the case 101 and the other end of it is formed by being continued with the identifying concave portion 118. Stepped portions 121 different from each other in depth are formed on the guide groove 120 in the direction perpendicular to the bottom 115 of the case 101 at the position adjacent to the front portion 111 of the case 101. The guide groove 120 guides the SQ battery pack 1 in the setting direction shown by the arrow A to the slot 162 of the battery charger 151.

As shown in FIG. 6, a guide groove 122 is formed at the position opposite to the guide groove 120 at the both sides of the communication terminal 114. The guide groove 122 is formed in parallel with the longitudinal direction of the bottom 115 of the case 101.

A controlling groove 103 (though not illustrated, another groove 103 is also formed at the same position of the left side face of the front portion 111) adjacent to the input/output terminals 112 and 113 is formed at the width directional both side faces of the case 101. The controlling groove 103 opens at the front portion 111 and is formed in approximately parallel with the bottom 115 to control the width directional tilt of the bottom 115 from the slots 162.

A small locking concave portion 124 and a large locking concave portion 125 to be engaged with the slot 162 are formed on the bottom 115 of the case 101 when the bottom 115 is attached to the battery charger 151. The small locking concave portion 124 is formed into an approximate rectangle on the approximate center line of the case 101 in its width direction so as to be adjacent to the identifying concave portion 118. The large locking concave portion 125 is formed into an approximate rectangle slightly larger than the small locking concave portion 124 at the back side in the attaching direction on the approximate center line of the case 101 in its width direction.

Figure 7:
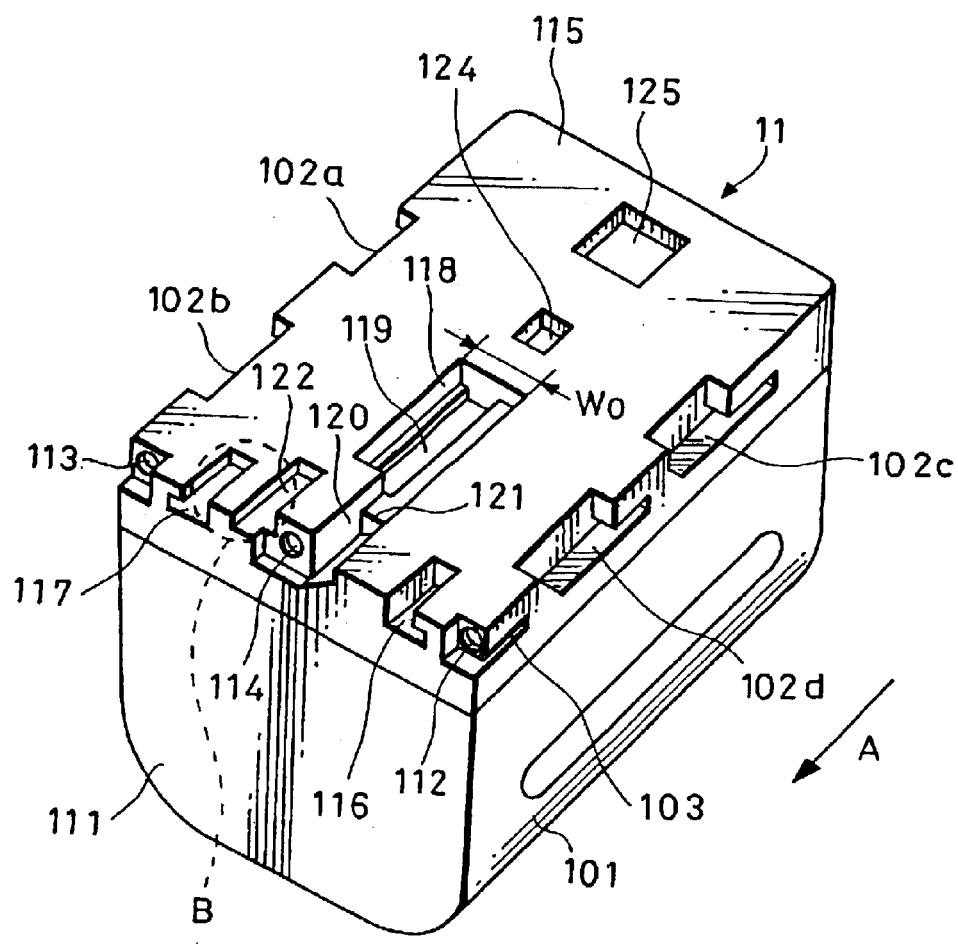
FIG. 7 is a view showing details of a conventional battery pack.

A type of battery pack deciding concave portion 131 serves as a concave portion for identifying the SQ battery pack 1 and the battery pack 11 when the portion 131 is attached to the slot 162 of the battery charger 151. As shown in FIG. 7, in case of the type of battery pack deciding concave portion 131, a concave portion is formed on the portion shown by B of the conventional battery pack 11 in FIG. 7 by the same depth as the guide groove 122 and the same length as the longitudinal direction of the controlling portion 117 when viewed from the bottom 115. That is, the type of battery pack deciding concave portion 131 has a configuration in which a part of the bottom 115 of the conventional battery pack 11 is cut out. Because the difference between shapes of the conventional battery pack 11 and SQ battery pack 1 lies in only presence or absence of the type of battery pack deciding concave portion 131, other description is omitted.

Figure 8:
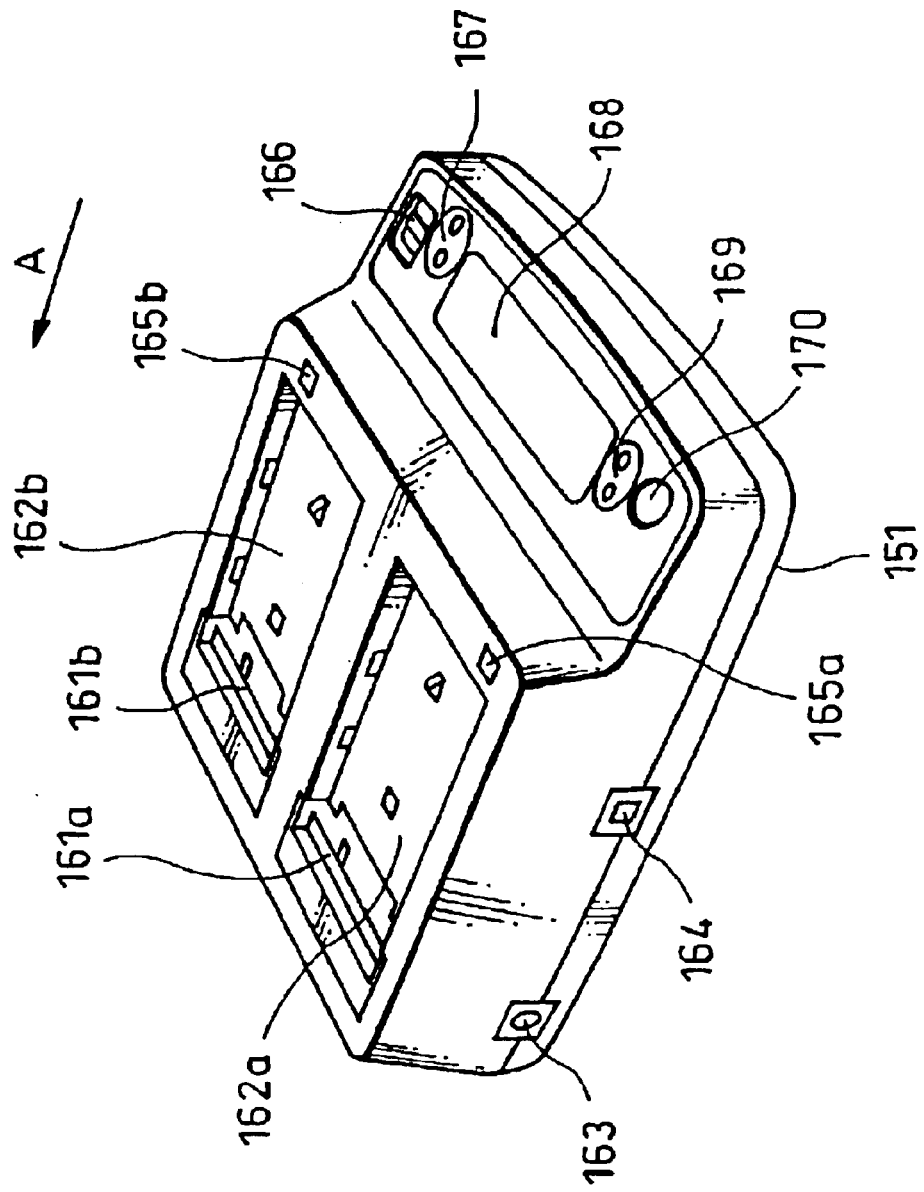
FIG. 8 is a view showing a configuration of a battery charger.

Then, the configuration of the battery charger 151 is described below with reference to FIG. 8.

It is possible to attach two battery packs to the battery charger 151. Moreover, terminal shutters 161a and 161b of the battery charger 151 are flat. Therefore, when the SQ battery pack 1 or the battery pack 11 is not attached, the shutters 161a and 161b are pushed out in the direction opposite to the direction of the arrow A in FIG. 8 due to the repulsion of a not illustrated spring built in the body of the battery charger 151 and fixed at a predetermined length to cover terminal portions of the battery charger 151 to be described later. Moreover, when the SQ battery pack 1 or battery pack 11 is attached along the slot 162 and the terminal shutters 161 are pushed against the repulsion of a not illustrated spring by the front portion 111, the shutters 161 slide in the direction of the arrow A in FIG. 8 and are stored in the body of the battery charger 151. Thus, because the terminal shutters 161 are stored, the terminal portion of the battery charger 151 is exposed and moreover, the SQ battery pack 11 or battery pack 1 is attached (connected). Details of the slot 162 will be described later.

A DC (Direct Current) input terminal 163 is a terminal to which a not illustrated cable for supplying power to the battery charger 151 is attached and rated power is supplied. A DC output terminal 164 is a terminal to which a not illustrated cable for outputting the power supplied from the DC input terminal 163 to a video camera 2 is attached and which outputs the power at a voltage value and a current value corresponding to the video camera 2. It should be noted that an AC (Active Current) input terminal is also provided therein.

Charging lamps 165a and 165b are lamps for respectively showing a battery pack currently supplying (charging) power among the battery packs attached to the slots 162a and 162b and are turned on at the slot 162 supplying power.

A mode changing switch 166 is a switch for changing operation modes of the battery charger 151 and selecting either of the mode to output to a video camera set to the DC output terminal 164 and the mode to charge a battery pack attached to the slots 162.

A charging mode lamp 167 shows two modes while the battery charger 151 performs charging. One of them is a quick charging mode for charging the conventional battery pack 11 and the other of them is a super-quick charging mode for charging the SQ battery pack 1. The super-quick charging mode is a charging mode to quickly perform charging at a large current compared to the case of the quick charging mode.

A display portion 168 is constituted of a LCD (Liquid Crystal Display) or the like to display a charged state or other information.

Figure 9:
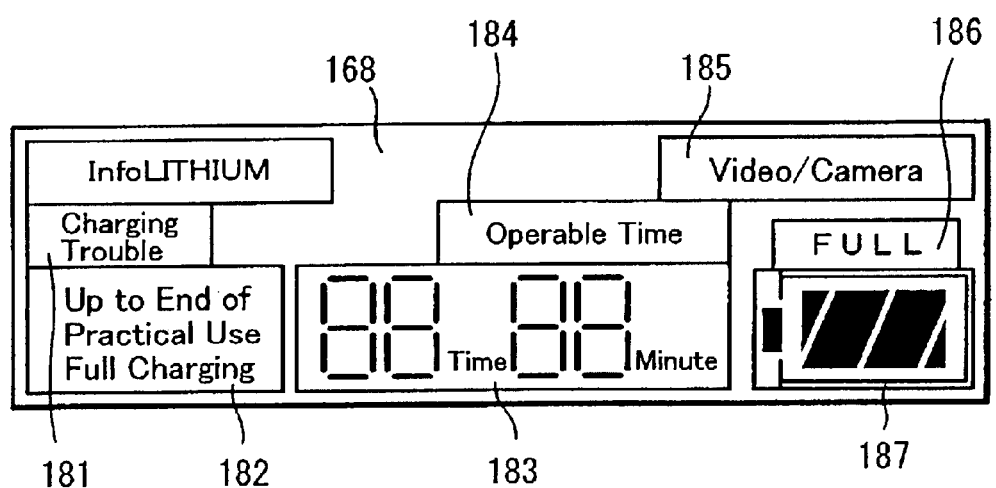
FIG. 9 is a view for explaining the displaying portion in FIG. 8.

FIG. 9 shows details of the displaying portion 168. FIG. 9 shows a state in which all portions which can be displayed as an LCD are displayed. Therefore, a part of the display in FIG. 9 is actually displayed.

A charging trouble displaying portion 181 is a portion showing "charging trouble" located at the top left of the displaying portion 168, which is displayed when a trouble is detected in the set SQ battery pack 1 or battery pack 11 while it is charged.

A remaining charging time displaying portion 182 displays a remaining charging time, on which a message "up to end of practical use charging" is displayed when showing a practical use charged state, that is, the time up to an operable charged state, a message "up to end of full charging" when showing the charging time until completely charged in the display "up to end of practical use full charging" and in this case, the time up to end of each charging is displayed on a time displaying portion 183.

An allowable operation time displaying portion 184 is displayed when displaying the allowable operation time of the SQ battery pack 11 or battery pack 11 and in this case, a corresponding allowable operation time is displayed on the time displaying portion 183.

A video camera displaying portion 185 is displayed in a mode in which power is supplied to the video camera 2 by the mode changing switch 166.

A full charge displaying portion 186 is displayed when the attached SQ battery pack 1 or battery pack 11 is fully charged (charging capacity of 100%). A battery mark 187 displays a charged state of the SQ battery pack 1 or battery pack 11, in which a displayed portion increases as the current charged state approaches a fully charged state and the displayed portion decreases when a charged capacity is small.

The battery charger 151 in FIG. 8 is described below again.

A charge slot displaying lamp 169 is constituted of two lamps showing the slots 162*a* and 162*b* respectively and is a lamp showing that the displaying portion 168 shows the information on an attached battery pack.

A display changing button 170 is a button for changing displayed contents of the displaying portion 168 whenever the display charging button is pressed. Whenever pressing the display charging button, the displayed slot 162 is changed (change of charge slot lamp 169) and the time display up to end of charging and the allowable operation time display are changed.

Then, the detailed configuration of the slot 162 is described below with reference to FIG. 10. The slot 162*a* and 162*b* have the same configuration.

The slot 162 is formed so as to be slightly larger than the shape of the bottom 115 of the SQ battery pack 1 or battery pack 11. The slot 162 has a pair of guide convex portions 201*a* and 201*b* engaged with each guide groove 102 of the SQ battery pack 1 of battery pack 11 adjacently to a mounting face 208 at each side opposite to the width directional both sides of the SQ battery pack 1 of battery pack 11. Though not illustrated, two guide portions 201*a* and 201*b* are further provided at opposed positions to the width direction of the slots 162.

The guide convex portions 201 are inserted into the guide grooves 102 of the case 101 respectively when attaching the SQ battery pack 1 or battery pack 11. Thereby, the slot 162 guides an inserting direction by making the bottom 115 of the case 101 approximately parallel with the mounting face 208 and hold the SQ battery pack 1 or battery pack 11.

When setting the SQ battery pack 1 or battery pack 11, connection terminals 202 and 203 and a communication terminal 204 are arranged on the bumping face 205 of a slot opposite to the front portion 111. These terminals are usually covered under a state in which the terminal shutter 161 slides up to the same position as the right side in FIG. 10 where the controlling convex portions 206 and 207 become L shape in the direction opposite to the direction of the arrow A and protected from an impact or the like. FIG. 10 shows a state in which the terminal shutter 168 slides in the direction of the arrow A and is housed in the body of the battery charger 151.

The connection terminals 202 and 203 are located at the width directional both sides of the slot 162 and connected to the input/output terminals 112 and 113 of the SQ battery pack 1 or battery pack 11 respectively. The communication terminal 204 is located at the approximate center of the slot 162 in its width directions and connected to the communication terminal 114 of the battery pack 1. The connection terminals 202 and 203 and the communication terminal 204 are arranged on the bumping face 205 of the slot 162 in parallel with the bottom 115 of the SQ battery pack 1 or battery pack 11 and in parallel with the longitudinal direction of the SQ battery pack 1 or battery pack 11.

Moreover, a pair of controlling convex potions 206 and 207 engaged with the controlling concave portions 116 and 117 of the SQ battery pack 1 or battery pack 11 respectively while bestriding the bumping face 205 and mounting face 208 are respectively integrally formed on the slot 162 line symmetrically to the approximate center line in the width direction.

These controlling convex portions 206 and 207 respectively have a first portion formed perpendicularly to the mounting face 208 and a second portion formed perpendicularly to the first portion and whose cross sections respectively show an approximate L shape. These controlling convex portions 206 and 207 control that the bottom 115 of the battery pack 11 is tilted from the mounting face 208 of the slot 162 in the width direction.

Moreover, a guide convex portion 210 for guiding the inserting direction of the SQ battery pack 1 or battery pack 11 are integrally formed at a position adjacent to the communication terminal 204 while bestriding the bumping face 205 and mounting face 208. As shown in FIG. 10, the guide convex portion 210 is formed in parallel with the longitudinal direction of the mounting face 208 at a position engaged with the guide groove 120 at the bottom 115 of the SQ battery pack 1 or battery pack 11 to be attached.

Furthermore, a guide convex portion 211 for guiding the attaching direction of the SQ battery pack 1 or battery pack 11 is formed on the slot 162 in parallel with the longitudinal direction of the mounting face 208 while bestriding the bumping face 205 and mounting face 208. The guide convex portion 211 guides the setting direction by engaging with the guide groove 122 of the SQ battery pack 1 or battery pack 11.

Furthermore, a controlling pawl 209 engaging with a controlling groove 123 is integrally protruded and formed at the width directional both sides of the slot 162 respectively. The controlling pawl 209 is formed in parallel with the mounting face 208 and the longitudinal direction of the SQ battery pack 1 or battery pack 11. Though not illustrated, one more controlling pawl 209 is formed on an opposed face to the width direction of the slot 162.

Furthermore, an identifying convex portion 212 engaging with the identifying convex portion 118 for identifying whether the SQ battery pack 1 or battery pack 11 can be charged is integrally formed with the slot 162 at the approximate center of the mounting face 208. The identifying convex portion 212 is formed into an approximate rectangular parallelepiped. A convex piece 212a engaging with the identifying groove 119 of the SQ battery pack 1 or battery pack 11 is integrally formed at the front end of the identifying convex portion 212. Furthermore, as shown in FIG. 10, the identifying convex portion 212 is formed such that the dimension of the mounting face 208 parallel with the width direction becomes equal to a width W1 smaller than the width W0 of the identifying concave portion 118 of the SQ battery pack 1 or battery pack 11 and the portion 212 can be inserted into the identifying concave portion 118. Furthermore, the identifying convex portion 212 is formed at a position separate by a predetermined distance in the direction orthogonal to the bumping face 205.

Figure 10:
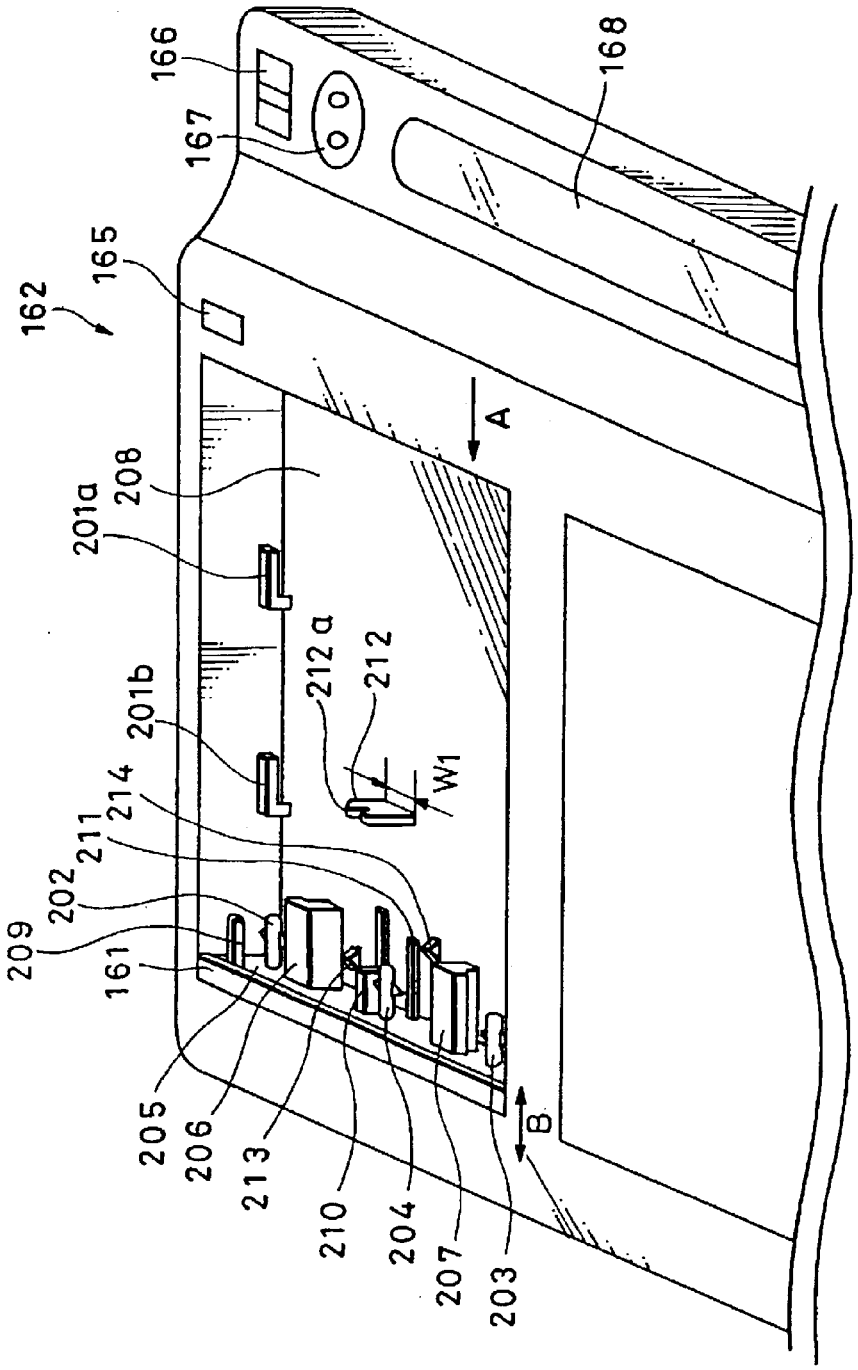
FIG. 10 is a view showing details of the slot in FIG. 8.
Figure 11:
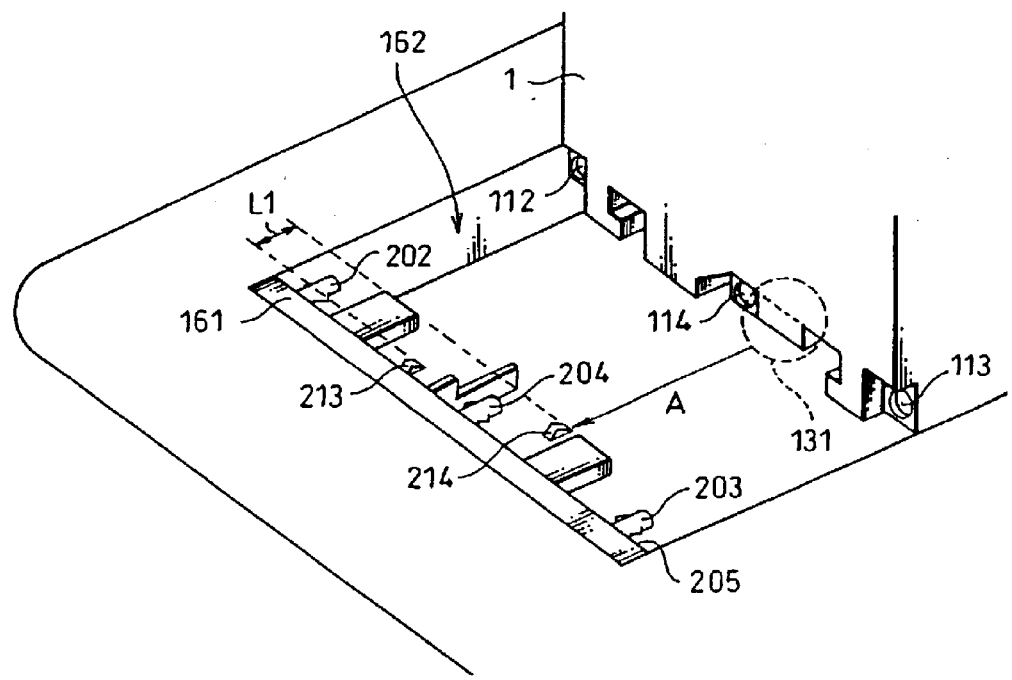
FIG. 11 is a view showing a configuration for attaching the SQ battery pack in FIG. 5 to the slot in FIG. 10.

A charging on/off switch 213 is a spring like switch which can be pressed to the upper and lower direction of the figure and is turned on when the SQ battery pack 1 or battery pack 11 is attached on the mounting face 208 so as to contact with the bottom 115 and pressed by the bottom 115 at a force equal to or more than the repulsion of the spring of the charging on/off switch 213 while sliding in the direction of the arrow A in FIG. 10 and outputs to a microcomputer 271 (FIG. 15).

Figure 12:
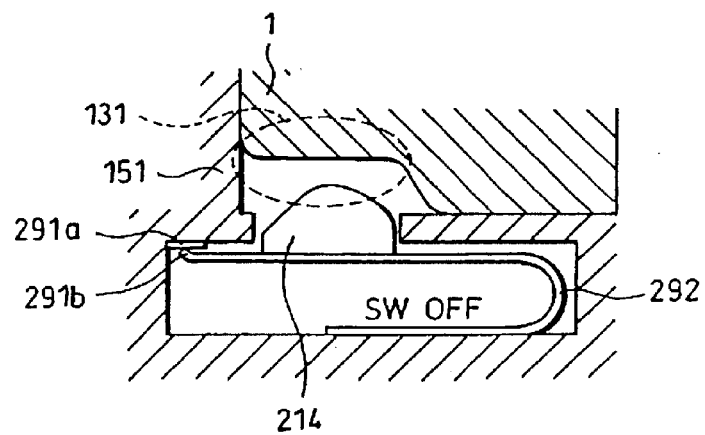
FIG. 12 is a view showing a configuration around the type of battery pack deciding switch in FIG. 10.

A type of battery pack deciding switch 214 is a spring like switch which can be pressed to the upper and lower direction of the figure and identifies whether a set battery pack is the conventional battery pack 11 or SQ battery pack 1. As shown in FIG. 8, for example, when the SQ battery pack 1 is attached, the type of battery pack deciding concave portion 131 is provided for a position corresponding to the type of battery pack deciding switch 214 of the SQ battery pack 1 and because of the concave portion, the type of battery pack deciding switch 214 is not pressed by the bottom 115 of the SQ battery pack 1 as shown in FIG. 12. In this case, contact points 291a and 291b are kept contacted each other due to the upward repulsion of a spring 292, the electrically connected information is communicated to the microcomputer 271 (FIG. 15), and thereby it is recognized that an attached battery pack is the SQ battery pack 1 under the charging to be described later. The type of battery pack deciding switch 214 decides an off state when the contact points 291a and 291b contact.

Figure 13:
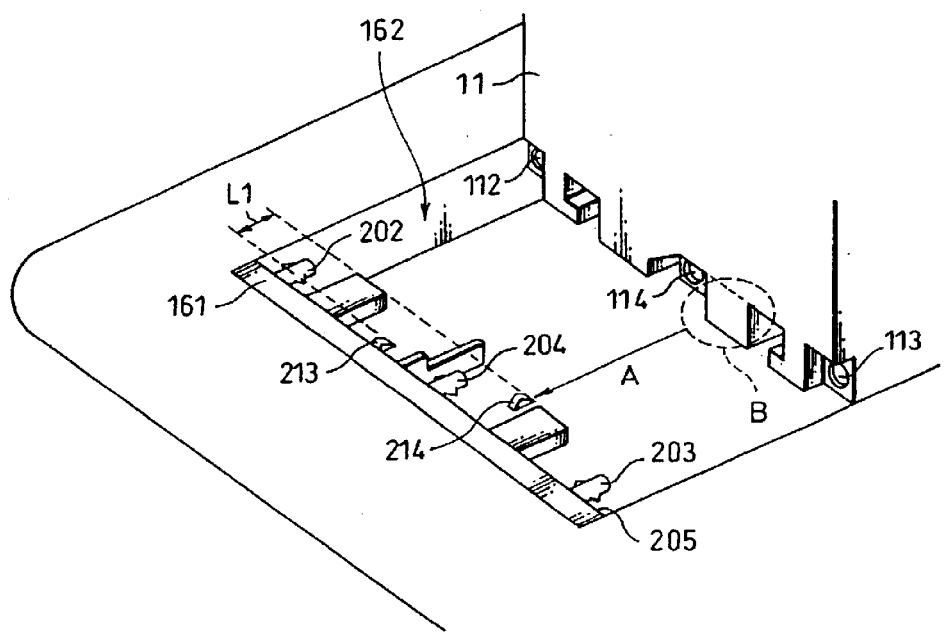
FIG. 13 is a view showing a configuration for attaching the battery pack in FIG. 7 to the slot in FIG. 10.
Figure 14:
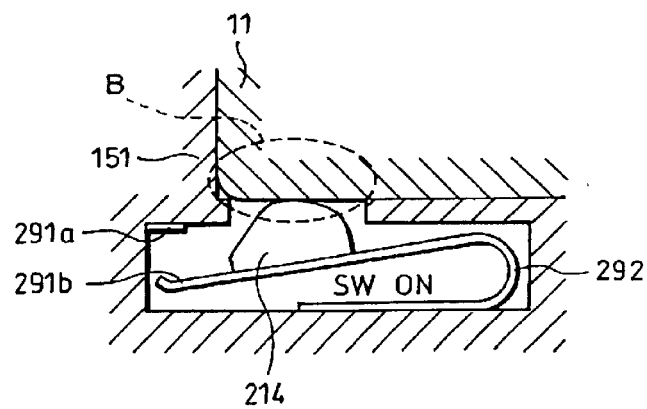
FIG. 14 is a view showing a configuration around the type of battery pack deciding switch in FIG. 10.

Moreover, as shown in FIG. 13, when the conventional battery pack 11 is attached, the portion B having no concave portion shown in FIG. 7 slides to a position corresponding to the type of battery pack deciding switch 214 of the battery pack 11 in the direction of the arrow A in FIG. 13. Therefore, as shown in FIG. 14, the bottom 115 presses the type of battery pack deciding switch 214 at a force equal to or more than the upward repulsion of the spring 292 in FIG. 14. In this case, the contact points 291a and 291b become non contact state and thereby, become a not electrically connected state. When the above information is communicated to the microcomputer 271 (FIG. 15) and thereby, it is recognized that a set battery pack is the conventional battery pack 11 under the charging to be described later. The type of battery pack deciding switch 214 decides the on state when the contact points 291a and 291b are kept in a non contact state.

Since the slot 162 is constituted as described above, it is possible to attach the SQ battery pack 1 or battery pack 11 to the battery charger 151.

The battery attaching portion 3 of the video camera 2 to which the battery pack 11 is attached has the same configuration as the slot 162, so that the explanation thereof is omitted.

Then, an electrical configuration (first configuration) of the SQ battery pack 1 and battery charger 151 is described below with reference to FIG. 15. The SQ battery pack 1 is attached to the slots 162a and 162b in FIG. 15 and the both configurations are the same.

The battery cell 251 of the SQ battery pack 1 is a cell for storing the power supplied from the battery charger 151 by the input/output terminals 112 and 113.

A microcomputer 252 is constituted of a CPU (Central Processing Unit), RAM (Random Access Memory) and ROM (Read Only Memory), and driven by the power supplied through a reg (regulator) 253. The microcomputer 252 collects information about a current supplied to the battery cell 251 which is detected by a resister 256 and a current detector 257, an internal temperature of the SQ battery pack detected by a thermistor 256 and a charging voltage of the cell detected by a voltage detector 258 together with information (of the present time) about the SQ battery pack relating to a charging capacity Q, a charging voltage Vr, a charging standard capacity Qs, an offset voltage Voffset, the corresponding charging mode (The charging mode of the SQ battery pack is super-quick charging mode.) and the like; controls a communication circuit 254; and supplies an output signal to the battery charger 151 by means of the communication terminal 114. The charging capacity hereby means a value obtained by multiplying a dischargeable current value and dischargeable time relating to the battery cell 251 in that moment. In addition the charging standard capacity means a value obtained by multiplying dischargeable current value and dischargeable time relating to the battery cell 251 at the condition of full charge. Though the conventional battery pack 11 has the same configuration, it cannot be charged at a large current compared to the SQ battery pack 1, because the characteristic of the battery cell 251 is different.

Then, an electrical configuration example (first configuration) of the battery charger 151 is described below.

The microcomputer of the battery charger 151 is constituted of a CPU, a RAM and a ROM to execute various processings of the battery charger 151 and displays various information on the displaying portion 168. The communication circuit 272 is controlled by the microcomputer 271 to communicate with either of SQ battery packs 1a and 1b attached to the slots 162a and 162b by a communication switching unit 273.

The charging changeover switch 274 is controlled by the microcomputer 271 to switch to a terminal 274b or 274c which corresponds to either of the slots 162a and 162b to be charged from a terminal 274a which is a currently resting terminal at the start of charging.

A charging mode changeover switch 275 is controlled by the microcomputer 271 to switch to the charging mode corresponding to on or off state of the type of battery pack deciding switch 214. More specifically, the charging mode changeover switch 275 is switched from a currently resting terminal 275a to a terminal 275c connected to a quick charging mode power source 277 in case of the battery pack 11 and to a terminal 275c connected to a super-quick charging mode power source 276, the current value of which is larger than that of a quick charging mode in case of the SQ battery pack 1 under charging in accordance with the type of the battery pack set to the slot 162. In more detail, during the initial time after the start of charging the battery pack 11 or the SQ battery pack 1 set in a charging position and charging is generally done by an initial charging mode of super-low current (approximately 100 mA), so that the charging mode changeover switch 275 is switched to a terminal 275d and to an initial charging power supply. This initial charging mode is a mode utilized in the case when the characteristic of the battery cell 251 is deteriorated if it is charged by the nominal current value, for example, when the SQ battery is under over-discharge condition, when a over-discharge protection circuit which is not shown is operated, or the like. In addition, when the charging mode changeover switch 275 is switched to a terminal 275e, an AC power source 280 supplies power to the SQ battery pack by converting power supplied through an AC input terminal of outside, which is not shown, to DC power.

Then, the charging capacity correction processing when charging the SQ battery pack 1 by setting it to the slot 162 of the battery charger 151 is described below with reference to the flowchart shown in FIG. 16. It should be noted that in the explanation below, the slots 162a and 162b are explained at the same time without distinguishing each other, because they are formed as same constructions or symmetrically.

In a step S1, the microcomputer 271 connects the charging mode changeover switch 275 from the terminal 275a connected in the resting state to the terminal 275d to change to the initial charging mode power source 278, and moreover changes the charging changeover switch 274 from the terminal 274a to the terminal 274b and starts charging in the initial charging mode.

In a step S2, the microcomputer 271 judges whether or not communication can be made with the SQ battery pack 1 being currently charged in the initial charging mode and continues charging in the initial charging mode until communication can be made. When it is judged in the step S2 that communication can be made with the SQ battery pack 1, the processing advances to step S3.

The microcomputer 271, through the communication circuit 272 and the communication switching unit 273, requests the microcomputer 252 of the attached SQ battery pack 1 to send the information on charging capacity Q, charging voltage Vr, standard charging capacity Qs, pre end voltage Vpre, end voltage Ve and offset voltage Voffset and reads them.

Figure 17:
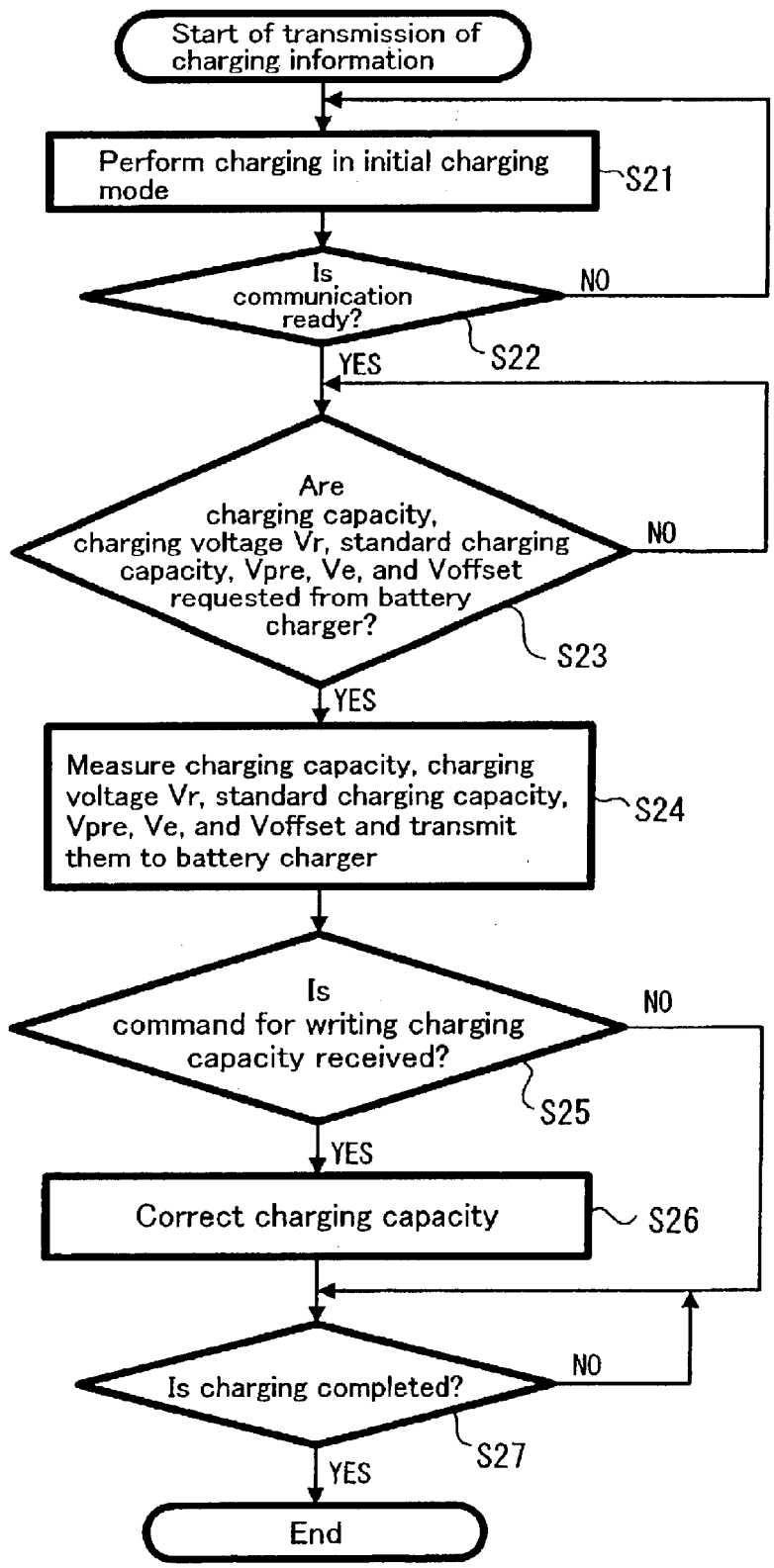
FIG. 17 is a flowchart for explaining charging information transmission of a SQ battery pack.

Then, the process is described below with reference to the flowchart in FIG. 17, in which the SQ battery pack 1 receives requests for charging capacity Q, charging voltage Vr, standard charging capacity Qs, pre end voltage Vpre, end voltage Ve and offset voltage Voffset from the microcomputer 271 of the battery charger 151 and transmit those information.

Figure 16:
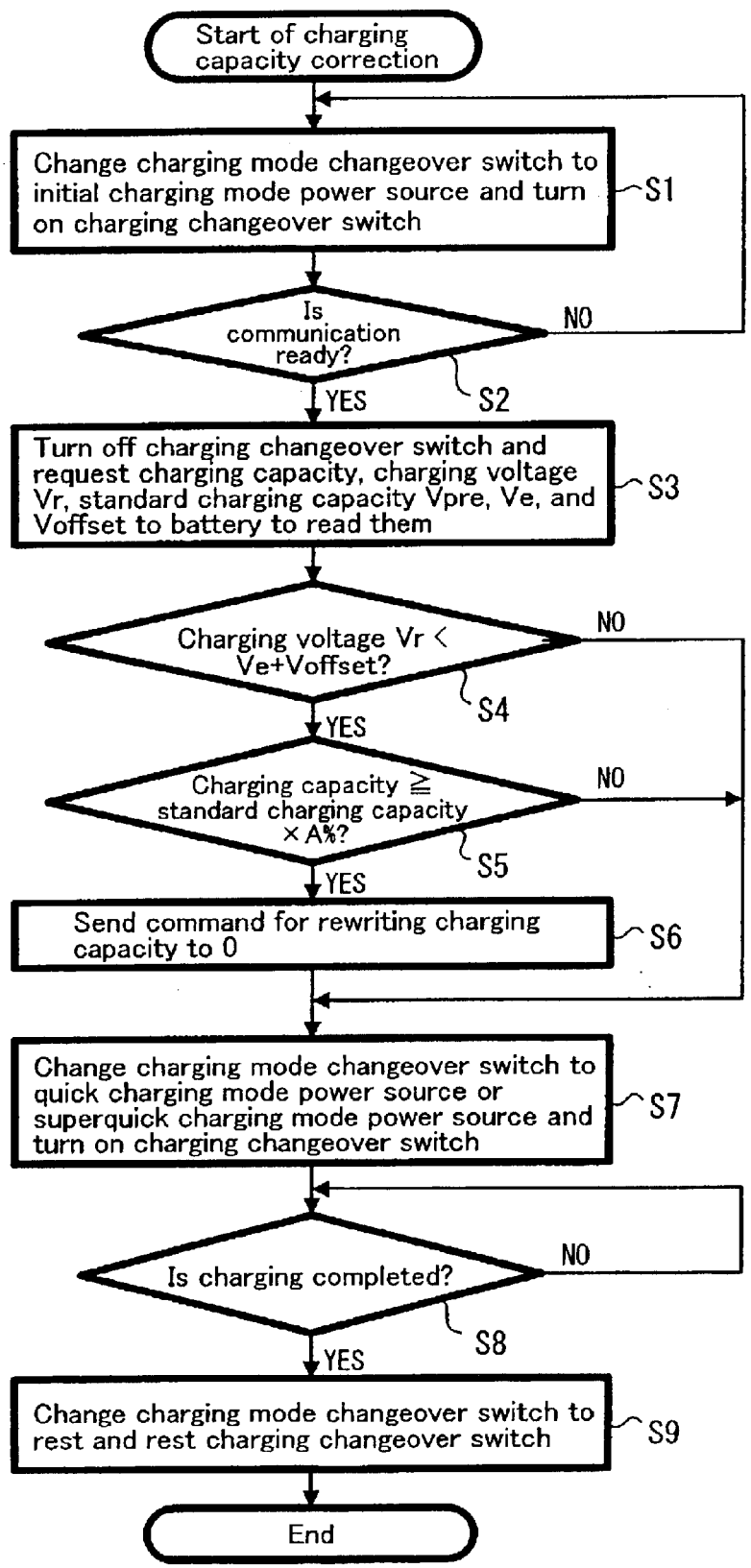
FIG. 16 is a flowchart for explaining charging capacity correction of a battery charger.

In a step S21, the battery cell 251 is charged (receives power) in the initial charging mode through the processing step S1 in the flowchart in FIG. 16. In a step S22, the microcomputer 252a judges whether or not communication can be made and repeats charging through the processing in the step S21 until communication is possible. When it is judged in the step S22 that communication, the microcomputer 252a judges in a step S23 whether or not charging capacity Q, charging voltage Vr, standard charging capacity Qs, pre end voltage Vpre, end voltage Ve and offset voltage Voffset are requested from the microcomputer 271 of the battery charger 151 and repeats the processing until they are requested. When it is judged that charging capacity Q, charging voltage Vr, standard capacity Qs, pre end voltage Vpre, end voltage Ve and offset voltage Voffset are requested, the process advances to a step S24.

In the step S24, the microcomputer 252 controls the voltage detector 258, measures the charging voltage Vr, further reads the up to date values of the charging capacity Q, standard charging capacity Qs, pre end voltage Vpre, end voltage Ve and offset voltage Voffset stored in the RAM, controls the communication circuit 254, and transmits the data to the battery charger 151.

In this case when charging is performed in the initial charging mode and the SQ battery pack 1 is overdischarged, the microcomputer 252 cannot be driven, so that during the above period, only charging is executed through the processing in the step S21, and when the battery pack 1 is charged until the microcomputer 252 can be driven, the started microcomputer 252 judges whether or not communication is possible in the step S22 and executes the judgment of the request in the step S23.

Then, the flowchart in FIG. 16 is described below again.

In a step S4, the microcomputer 271 judges whether or not the charging voltage Vr is smaller than the sum of the end voltage Ve and the offset voltage Voffset. When it is judged in the step S4 that the charging voltage Vr is smaller than the sum of the end voltage Ve and the offset voltage Voffset, the microcomputer 271 judges in a step S5 whether or not the charging capacity Q is equal to or more than A % (e.g. A % is equal to 40%) of the standard charging capacity Qs. When the microcomputer judges that the charging capacity Q is equal to or more than A % of the standard charging capacity Qs, it controls, in a step S6, the communication circuit 272 and transmits to the SQ battery pack 1 a command for making the SQ battery pack 1 rewrite (correct) the charging capacity Q to zero.

In a step S7, the microcomputer 271 controls the charging mode changeover switch 275 to select the terminal 275b and changes the current power source to the super-quick charging mode power source 276 for the super-quick charging mode.

In a step S8, the microcomputer 271 controls the communication circuit 272, judges whether on not charging is completed by the communicating with the SQ battery pack 1, and repeats the processing until charging is completed. In the step S8, when it is judged that charging is completed, the microcomputer 271, in a step S9, changes the charging mode changeover switch 275 to the terminal 275a and additionally connects the charging changeover switch 274 to the terminal 274a to complete charging.

When it is judged in the step S4 that the charging voltage Vr is not smaller than the sum of the end voltage Ve and offset voltage Voffset, the processing in the step S5 and S6 is skipped and the processing advances to a step S7.

In the step S5, when it is judged that the capacity Q is not more than A % of the standard charging capacity Qs, the processing in the step S6 is skipped and the processing advances to the step S7.

Figure 18:
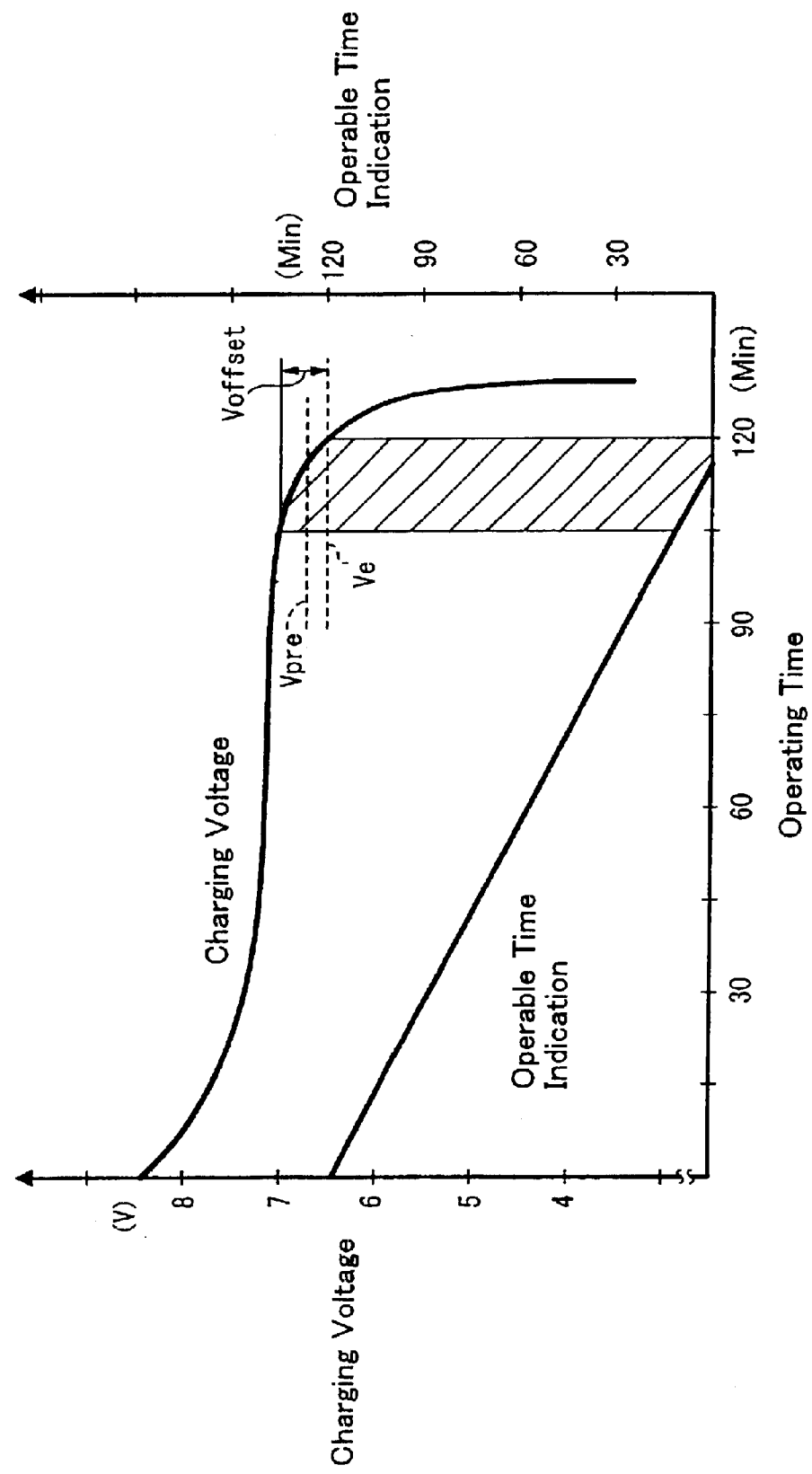
FIG. 18 is a view for explaining an offset voltage Voffset.

In more detail, as shown in FIG. 18, in the processings in the steps S4, S5 and S6, it is estimated that the charging capacity Q has a small value in a low voltage state (small charging capacity state) in a voltage range (hatched range in FIG. 18) from the end voltage Ve up to the end voltage Ve+offset voltage Voffset in the case that an offset voltage Voffset (e.g. 0.4 V) is set slightly larger than the difference between the pre end voltage Vpre and end voltage Ve, so that if the charging capacity Q transmitted from the SQ battery pack 1 has a large value, it can be said the value includes an error. Therefore, when setting the maximum value of the charging capacity Q to be A % (e.g. 40%) of the standard charging capacity Qs and the charging capacity Q transmitted from the SQ battery pack 1 is its maximum value (=Qs×A %) or more, the stored charging capacity Q is regarded as an incorrect value far away from an actual charging capacity. Additionally, in a low voltage state (small charging capacity state) in the voltage range from the end voltage Ve up to the end voltage Ve+ offset voltage, i.e., Voffset, the actual charging capacity Q is regarded as a value close to zero and the value is corrected to zero.

In more detail, theoretically the actual charging capacity Q might be accurately calculated in accordance with the characteristic and the charging voltage shown in FIG. 18 even in a low voltage state, but the characteristic shown in FIG. 18 easily causes an error due to a temperature particularly in a low voltage state. Therefore, according to the present invention, a charging capacity is corrected to zero in that range by setting an offset voltage Voffset which does not greatly influence on a necessary charging time or allowable operation time.

Back to the flowchart in FIG. 17 its explanation is done below again.

In a step S25, the microcomputer 252 judges whether or not a command for rewriting the charging capacity Q is received, and when, for example, a command for rewriting a charging capacity to zero is received through the processing in the step S6 in the flowchart of FIG. 16, the microcomputer 252 judges that the command is received and corrects the charging capacity Q stored in the RAM to zero in a step S26.

In a step S27, the microcomputer 252 judges whether or not charging is completed, repeats the processing until charging is completed, and completes the processing when charging is completed.

In the step S25, when a command for rewriting a charging capacity is not received, that is, when it is judged in the step S4 in the flowchart of FIG. 16 that the charging voltage Vr is not smaller than the sum of the end voltage Ve and the offset voltage Voffset or it is judged in the step S5 that the charging capacity Q is not more than A % of the standard charging capacity Qs, the processing in the step S26 is skipped.

Figure 19:
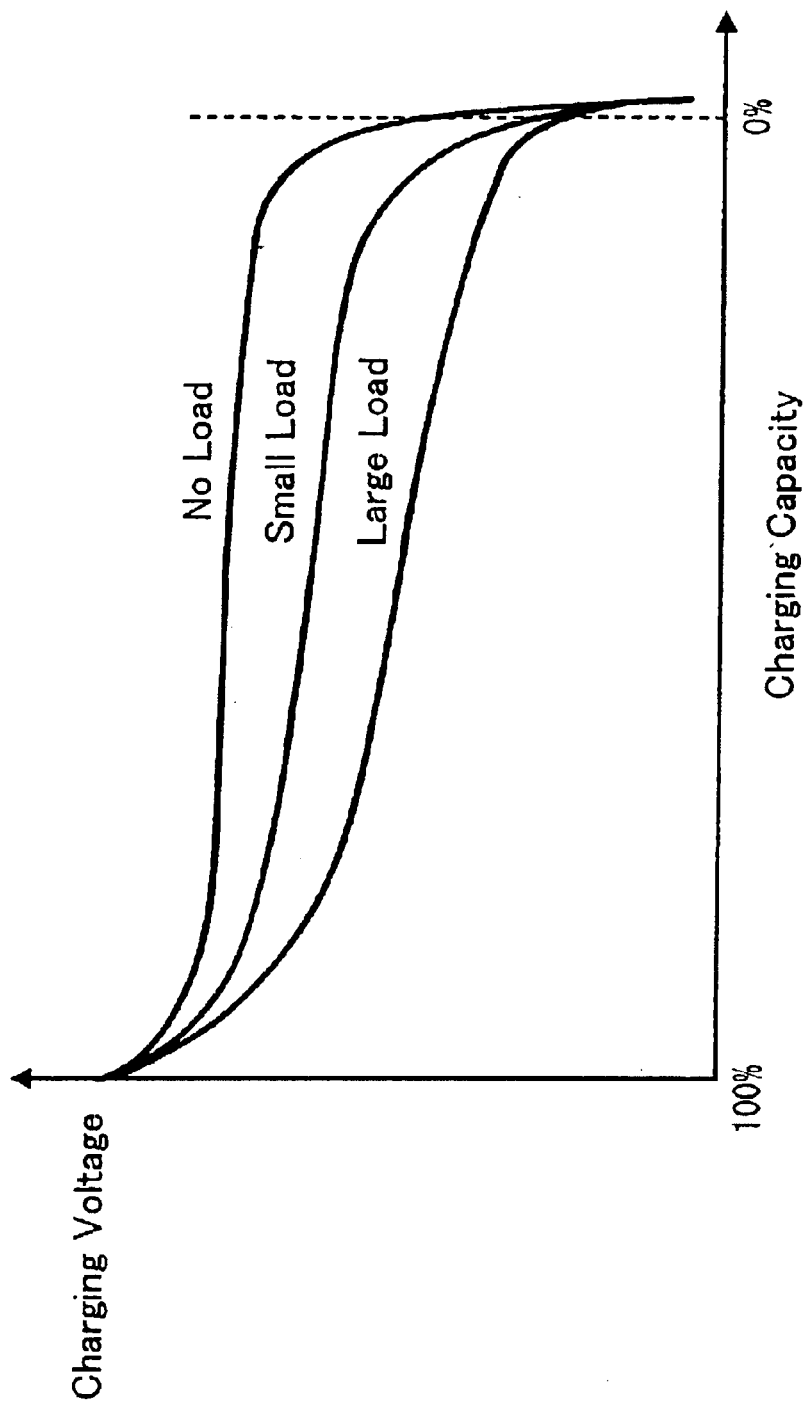
FIG. 19 is a view for explaining the relation between charging voltage Voffset and load.

Now, as shown in FIG. 19, the charging voltage of the SQ battery pack 1 has a characteristic in which the charging voltage is maximized when there is no load (supplied current value is zero) and lowers as a load (supplied current value) increases according to the relation between the charging voltage and the charging capacity. Therefore, in the step S24 in the flowchart of FIG. 17, an accurate charging voltage is measured, because a small current supplied from the initial charging mode power source 278 and the load from the battery charger 151 is substantially close to zero.

In the description above, the microcomputer 271 of the battery charger 151 judges whether or not the charging capacity Q of the SQ battery pack 1 is a correctly stored value, but it is allowed that the microcomputer 252 of the SQ battery pack 1 judges in accordance with the technique same as the above whether or not its own charging capacity Q is correctly stored and corrects the charging capacity Q by itself when it necessary.

Figure 20:
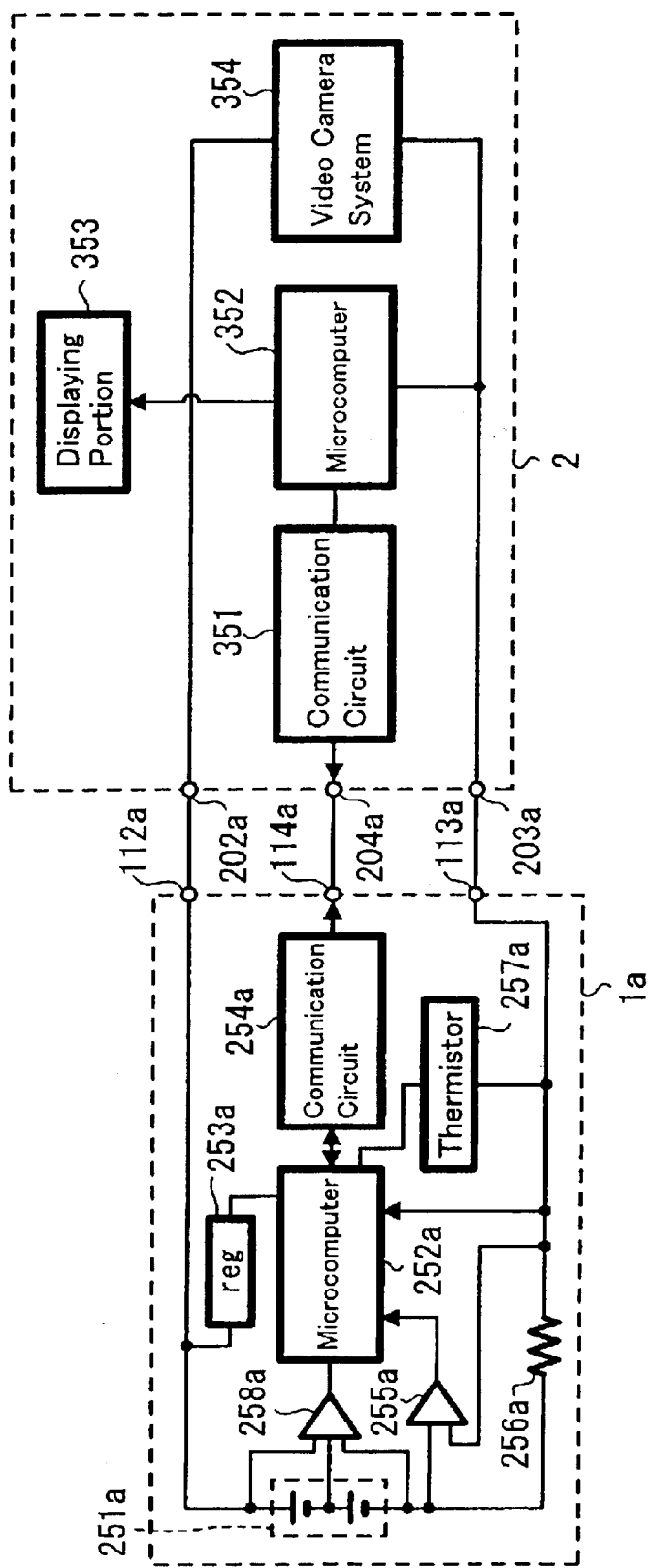
FIG. 20 is a view showing an electrical configuration of an SQ battery pack and the video camera in FIG. 4.

Moreover, a case is described above in which the battery charger 151 corrects the charging capacity Q, but as shown in FIG. 20, for example, it is also allowed that a unit such as a video camera 2 or the like in which the SQ battery pack 1 supplies power corrects the charging capacity Q. In case of the video camera 2 in FIG. 20, a microcomputer 352 constituted by a CPU, a RAM and a ROM controls every operation and a video camera system 354 including the rotational mechanism and recording mechanism of the video camera. Moreover, the microcomputer 352 makes a displaying portion 353 display the information on the SQ battery pack 1. Furthermore, the pre end voltage Vpre and the end voltage Ve of the SQ battery pack 1 are stored in the RAM of the microcomputer 352.

In this case, the microcomputer 352 requests to the set SQ battery pack 1 only for the charging voltage Vr through a communication circuit 351 and receives it. In this case, the microcomputer 352 temporarily stops supply of power from the SQ battery pack 1, measures the voltage opened charging voltage Vr (this is also regarded as the voltage of the power to be supplied to a video camera) under no load state or small load state close to no load state, and receives it (as a result, the accurate charging voltage Vr under a small load is measured). The microcomputer 352 judges whether or not the received charging voltage Vr is equal to or lower than the pre end voltage Vpre. When the microcomputer 352 judges that the received charging voltage Vr is equal to or lower than the pre end voltage Vpre, it makes the SQ battery pack 1 correct the stored charging capacity Q to zero and displays the corrected charging capacity Q on the displaying portion 353. Moreover, when the received charging voltage Vr is not equal to or lower than the pre end voltage Vpre, the microcomputer 352 does not correct the charging capacity Q.

The above correction substantially becomes the same as the processing where the offset voltage Voffset shown in FIG. 18 is set to the value of the difference between the pre end voltage Vpre and the end voltage Ve (=Vpre−Ve=Voffset) and A % which is used for setting the above maximum value is set to 0%. Therefore, the correction accuracy is lower than that of the processing described with reference to the flowchart in FIG. 16 (the width of a voltage value set in accordance with the offset voltage Voffset shown in FIG. 18 decreases and as a result, the width of a voltage value which can be corrected decreases), but it is unnecessary to further set a value other than the pre end voltage Vpre or the end voltage Ve to the microcomputer 352 of the video camera 2 and further, it is unnecessary to perform a new calculation processing, so that the charging capacity Q can be simply corrected so as to be practically usable.

A case of correcting a charging capacity to zero is described above, but it is not always necessary that a corrected value is equal to zero as long as the value is a value corresponding to zero which shows that a charging capacity is decreased.

As described above, since a charging capacity is corrected even when resting the SQ battery pack 1 for a long time without using it, it is possible to display an accurate charging capacity and realize efficient charging.

Though it is possible to execute a series of processings described above by hardware, it is also possible to execute them by software. To execute a series of processings by software, the software is installed in a computer in which a program constituting the software is built in exclusively in a hardware or a general purpose personal computer capable of executing various functions by installing various programs from a program storing medium.

Figure 21:
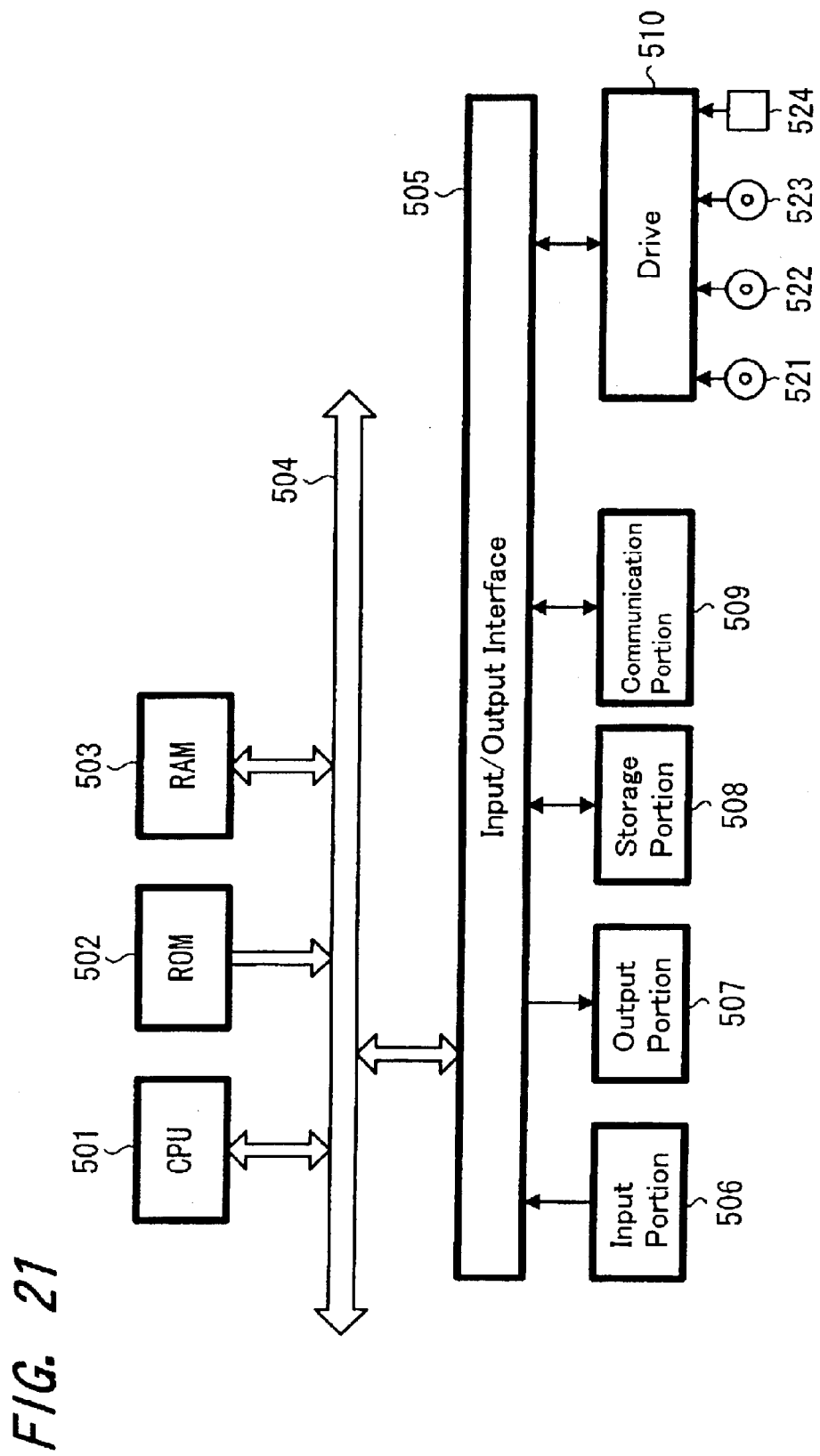
FIG. 21 is a view for explaining a program storing medium.

FIG. 21 shows a configuration of an embodiment of a personal computer for realizing the battery charger 151 by software. The CPU 501 of the personal computer controls all operations of the personal computer. Moreover, when a command is input from an input section 506 comprising a keyboard or mouse by a user through a bus 504 and an input/output interface 505, the CPU 501 executes a program stored in a ROM (Read Only Memory) 502 in correspondence with the input command. Moreover, the CPU 501 loads a program read from a magnetic disk 521, an optical disk 522, a magneto-optical disk 523 or a semiconductor memory 524 connected to a drive 510 and installed in a storing section 508 in a RAM (Random Access Memory) 503 to execute the program. Thereby, functions of the above described image processor 1 are realized by software. Moreover, the CPU 501 controls a communication section 509 to communicate with an external unit and execute exchange of data.

As shown in FIG. 21, a program storing medium in which programs are recorded is constituted by not only a package medium comprising the magnetic disk 521 (including a floppy disk), the optical disk 522 (including CD-ROM (Compact Disk-Read Only Memory), a DVD (Digital Versatile Disk)), the magnetooptic disk 523 (MD (Mini Disk)), or the semiconductor memory 524 in which programs are recorded and which are distributed to provide programs for users differently from a computer but also constituted by a hard disk included in the ROM 502 and a storing section 508 in which programs are recorded and which is provided for users while previously built in the computer.

In this description, a step of describing a program recorded in a program storing medium includes not only processings to be executed in time series along the described sequence but also processings to be executed in parallel or individually instead of being executed in time series.

Moreover, in this description, a system denotes the whole of an apparatus constituted by a plurality of units.

According to first charging/discharging apparatus and method and a program of the present invention, a standard charging capacity is stored, the present charging capacity is stored, a charging voltage value is measured, the information on the standard charging capacity, the charging capacity and the charging voltage value is transmitted to a power supplying apparatus, a command for correcting the charging capacity is received from the power supplying apparatus, and the stored charging capacity is corrected in accordance with the received command.

According to power supplying apparatus and method and a program of the present invention, the information on the standard charging capacity, the charging capacity and the charging voltage value of a charging/discharging apparatus transmitted from the charging/discharging apparatus is received and a command for correcting a charging capacity to zero or a value corresponding to zero is transmitted to the charging/discharging apparatus when the charging voltage value is equal to or less than a predetermined voltage value corresponding to a charging capacity close to zero and the charging capacity has a predetermined rate of the standard charging capacity or more.

According to first power supplying system and method and a program of the present invention, a charging/discharging apparatus stores a standard charging capacity and the present charging capacity, measures a charging voltage value, transmits the information on the standard charging capacity, the charging capacity and the charging voltage value to a power supplying apparatus, receives a command for correcting the charging capacity from the power supplying apparatus, corrects the stored charging capacity in accordance with the received command, and the power supplying apparatus receives the information on the standard charging capacity, the charging capacity and the charging voltage value of the charging/discharging apparatus transmitted from the charging/discharging apparatus and transmits a command for correcting a charging capacity to zero or a value corresponding to zero when the charging voltage value is equal to or lower than a predetermined voltage value corresponding to a charging capacity close to zero and the charging capacity has a predetermined rate of the standard charging capacity or more.

As a result, it is possible to accurately correct the charging capacity of the charging/discharging apparatus and moreover perform efficient charging in any case.

What is claimed is:

1. A charging/discharging apparatus for receiving power from a power supplying apparatus, comprising:
standard charging capacity storing means for storing a standard charging capacity;
charging capacity storing means for storing the present charging capacity;
charging voltage value measuring means for measuring a charging voltage value;
transmitting means for transmitting the information on said standard charging capacity, said charging capacity, and said charging voltage value to said power supplying apparatus;
receiving means for receiving a command for correcting said charging capacity from said power supplying apparatus; and
correcting means for correcting said stored charging capacity based on said command received from said receiving means.

2. A charging/discharging apparatus according to claim 1, characterized in that said charging voltage value measuring means measures a charging voltage value when the value of the power supplied from said power supplying apparatus is equal to zero or a sufficiently small value close to zero.

3. A charging/discharging apparatus according to claim 1, characterized in that said correcting means corrects said stored charging capacity to zero or a value corresponding to zero when said charging voltage value is equal to or less than a predetermined voltage value corresponding to said charging capacity close to zero and the charging capacity stored by said charging capacity storing means has a predetermined rate of said standard charging capacity.

4. A charging/discharging apparatus according to claim 1 further comprising current value measuring means for measuring a charging current value or discharging current value.

5. A charging/discharging apparatus according to claim 4, characterized in that said current value measuring means measures a charging current value or a discharging current value when the value of the current of the power supplied from said power supplying apparatus is equal to zero or a sufficiently small value close to zero.

6. A charging/discharging apparatus according to clam 4, characterized in that said correcting means corrects said stored charging capacity to zero when said charging current value is equal to or less than a current value corresponding to said charging capacity close to zero and the charging capacity stored by said charging capacity storing means has a predetermined rate of said standard charging capacity.

7. A charging/discharging apparatus according to claim 4, characterized in that said transmitting means further transmits said charging current value, said discharging current value, or temperature data to said power supplying apparatus in addition to the information on said standard charging capacity, said charging capacity and said charging voltage value.

8. A charging/discharging method of a charging/discharging apparatus for receiving power from a power supplying apparatus, comprising:

a standard charging capacity storing step for storing a standard charging capacity;

a charging capacity storing step for storing the present charging capacity;

a charging voltage value measuring step for measuring a charging voltage value;

a transmitting step for transmitting the information on said standard charging capacity, said charging capacity, and said charging voltage value to said power supplying apparatus;

a receiving step for receiving a command for correcting said charging capacity from said power supplying apparatus; and a correcting step for correcting said stored charging capacity based on said command received through the processing in said receiving step.

9. A power supplying apparatus for supplying power to a charging/discharging apparatus, comprising:

receiving means for receiving the information on the standard charging capacity, the charging capacity and the charging voltage value of said charging/discharging apparatus; and transmitting means for transmitting a command for correcting said charging capacity to zero or a value corresponding to zero to said charging/discharging apparatus when said charging voltage value is equal to or less than a predetermined voltage value corresponding to said charging capacity close to zero and said charging capacity has a predetermined rate of said standard charging capacity or more.

10. A power supplying apparatus according to claim 9, further comprising current controlling means for controlling the value of the current of the power to be supplied to said charging/discharging apparatus; characterized in that said charging voltage value is equal to a value when said current is controlled to zero or a sufficiently small value close to zero.

11. A power supplying apparatus according to claim 9, characterized in that said receiving means further receives a charging current value or discharging current value in addition to said standard charging capacity, said charging capacity and said charging voltage value transmitted from said charging/discharging apparatus.

12. A power supplying apparatus according to claim 11, further comprising current controlling means for controlling the value of the current of the power to be supplied to said charging/discharging apparatus; characterized in that said charging current value or the discharging current value is equal to a value when said current value is controlled to zero or a sufficiently small value close to zero.

13. A power supplying method of a power supplying apparatus for supplying power to a charging/discharging apparatus, characterized by including:

a receiving step for receiving the information on the standard charging capacity, the charging capacity and the charging voltage value of said charging/discharging apparatus transmitted from said charging/discharging apparatus; and a transmitting step for transmitting a command for correcting said charging capacity to zero or a value corresponding to zero to said charging/discharging apparatus when said charging voltage value is equal to or less than a predetermined voltage value corresponding to said charging capacity close to zero and the charging capacity has a predetermined rate of said standard charging capacity or more.

14. A power supplying system comprising a charging/discharging apparatus and a power supplying apparatus, characterized in that said charging/discharging apparatus is provided with;

standard charging capacity storing means for storing a standard charging capacity;

charging capacity storing means for storing the present charging capacity;

charging voltage value measuring means for measuring a charging voltage value;

first transmitting means for transmitting the information on said standard charging capacity, said charging capacity and said charging voltage value to said power supplying apparatus, first receiving means for receiving a command for correcting said charging capacity from said power supplying apparatus, and correcting means for correcting said stored charging capacity based on the command received by said first receiving means, and said power supplying apparatus is provided with;

second receiving means for receiving the information on the standard charging capacity, the charging capacity and the charging voltage value of said charging/discharging apparatus transmitted from said charging/discharging apparatus; and second transmitting means for transmitting a command for correcting said charging capacity to zero or a value corresponding to zero when said charging voltage value is equal to or less than a predetermined voltage value corresponding to said charging capacity close to zero and said charging capacity has a predetermined rate of said standard charging capacity or more.

15. A power supplying method of a power supplying system comprising a charging/discharging apparatus and a power supplying apparatus, characterized in that a charging/discharging method of said charging/discharging apparatus includes;

a standard charging capacity storing step for storing a standard charging capacity;

a charging capacity storing step for storing the present charging capacity;

a charging voltage value measuring step for measuring a charging voltage value;

a first transmitting step for transmitting said standard charging capacity, said charging capacity, and said charging voltage value to said power supplying apparatus;

a first receiving step for receiving a command for correcting said charging capacity from said power supplying apparatus; and a correcting step for correcting said stored charging capacity based on said command received through the processing in said first receiving step, and a power supplying method of said power supplying apparatus includes;

a second receiving step for receiving the information on the standard charging capacity, the charging capacity and the charging voltage value of said charging/discharging apparatus transmitted from said charging/discharging apparatus, and a second transmitting step for transmitting a command for correcting said charging capacity to zero or a value corresponding to zero to said charging/discharging apparatus when said charging voltage value is equal to or less than a predetermined voltage value corresponding to said charging capacity close to zero and said charging capacity has a predetermined rate of said standard charging capacity or more.

* * * * *